US012189323B2

(12) United States Patent
Ohmori et al.

(10) Patent No.: US 12,189,323 B2
(45) Date of Patent: Jan. 7, 2025

(54) CLEANING BLADE, IMAGE FORMING APPARATUS, AND PROCESS CARTRIDGE

(71) Applicants: Masahiro Ohmori, Kanagawa (JP); Keiichiro Juri, Kanagawa (JP)

(72) Inventors: Masahiro Ohmori, Kanagawa (JP); Keiichiro Juri, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/283,213

(22) PCT Filed: Mar. 10, 2022

(86) PCT No.: PCT/JP2022/010749
§ 371 (c)(1),
(2) Date: Sep. 21, 2023

(87) PCT Pub. No.: WO2022/219979
PCT Pub. Date: Oct. 20, 2022

(65) Prior Publication Data

US 2024/0053700 A1 Feb. 15, 2024

(30) Foreign Application Priority Data

Apr. 16, 2021 (JP) ................................ 2021-069731

(51) Int. Cl.
*G03G 21/00* (2006.01)

(52) U.S. Cl.
CPC ..... *G03G 21/0017* (2013.01); *G03G 21/0029* (2013.01)

(58) Field of Classification Search
CPC .......... G03G 21/0011; G03G 21/0017; G03G 21/0029
See application file for complete search history.

(56) References Cited

U.S. PATENT DOCUMENTS

| | | | | |
|---|---|---|---|---|
| 9,541,887 | B2 * | 1/2017 | Nakajima .......... | G03G 21/0017 |
| 2004/0170455 | A1 | 9/2004 | Shintani et al. | |
| 2015/0139711 | A1 | 5/2015 | Gohda et al. | |
| 2015/0370217 | A1 | 12/2015 | Shimizu et al. | |

(Continued)

FOREIGN PATENT DOCUMENTS

| | | |
|---|---|---|
| EP | 2879003 A1 | 6/2015 |
| JP | 09-281865 | 10/1997 |

(Continued)

OTHER PUBLICATIONS

International Search Report Issued May 16, 2022 for counterpart International Patent Application No. PCT/JP2022/010749 filed Mar. 10, 2022, 8 pages.

*Primary Examiner* — Sophia S Chen
(74) *Attorney, Agent, or Firm* — XSENSUS LLP

(57) ABSTRACT

Provided is a cleaning blade including an elastic blade having a strip shape, and a supporting member supporting the elastic blade. The cleaning blade is configured to bring a leading end ridgeline portion of the elastic blade into contact with a cleaning target member that is moving, and remove a residual matter from a surface of the cleaning target member. At least a surface layer portion of the elastic blade including the leading end ridgeline portion is formed of a rubber having a hysteresis loss ratio of 15% or less.

8 Claims, 3 Drawing Sheets

(56) References Cited

U.S. PATENT DOCUMENTS

| | | | | |
|---|---|---|---|---|
| 2016/0004206 | A1* | 1/2016 | Sakaguchi ......... | G03G 21/0017 399/350 |
| 2016/0274527 | A1* | 9/2016 | Gohda ............... | G03G 21/0017 |
| 2017/0003643 | A1 | 1/2017 | Aoyama et al. | |
| 2017/0017194 | A1* | 1/2017 | Toyama ............. | G03G 21/0017 |
| 2017/0199493 | A1 | 7/2017 | Watanabe et al. | |
| 2018/0017930 | A1 | 1/2018 | Aoyama et al. | |
| 2021/0200136 | A1 | 7/2021 | Juri et al. | |
| 2021/0216032 | A1 | 7/2021 | Watanabe et al. | |
| 2022/0221817 | A1 | 7/2022 | Juri et al. | |

FOREIGN PATENT DOCUMENTS

| | | |
|---|---|---|
| JP | 2004-199042 | 7/2004 |
| JP | 2008-268649 | 11/2008 |
| JP | 5060158 | 10/2012 |
| JP | 2014-085595 | 5/2014 |
| JP | 2016-009092 | 1/2016 |
| JP | WO2016/017184 A1 | 2/2016 |

* cited by examiner

[Fig. 1A]
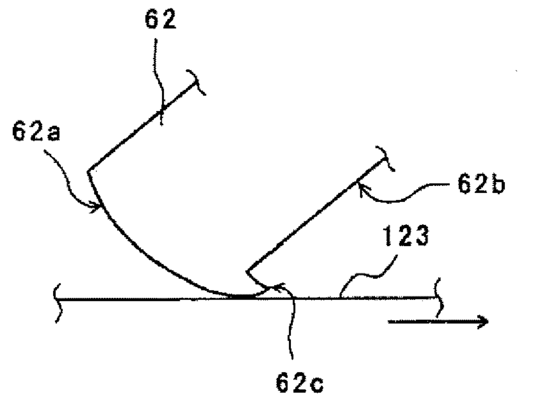
[Fig. 1B]
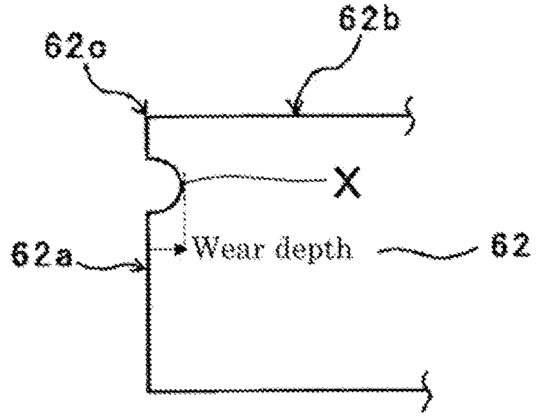
[Fig. 1C]
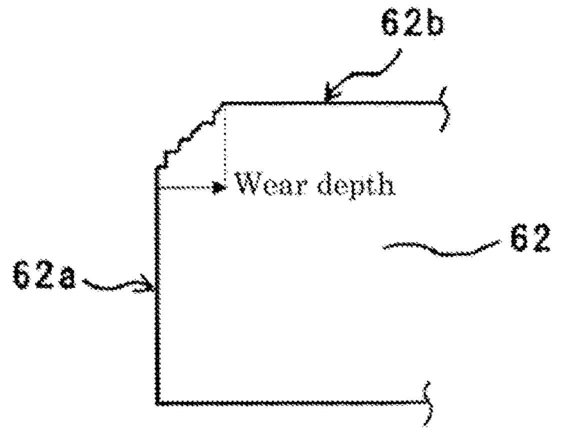
[Fig. 2A]
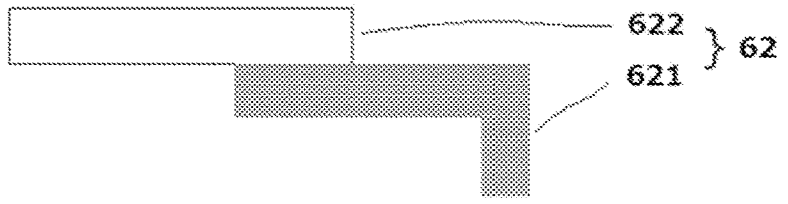

[Fig. 2B]
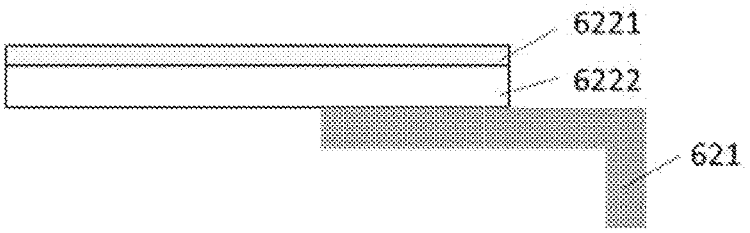
[Fig. 3]
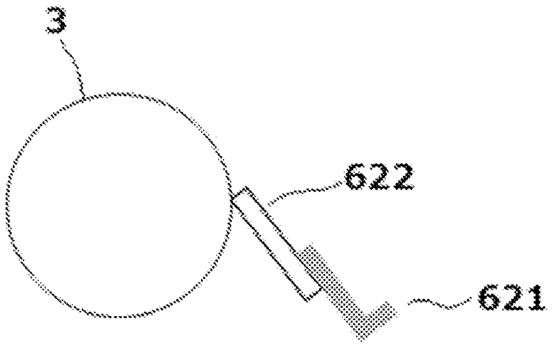
[Fig. 4]
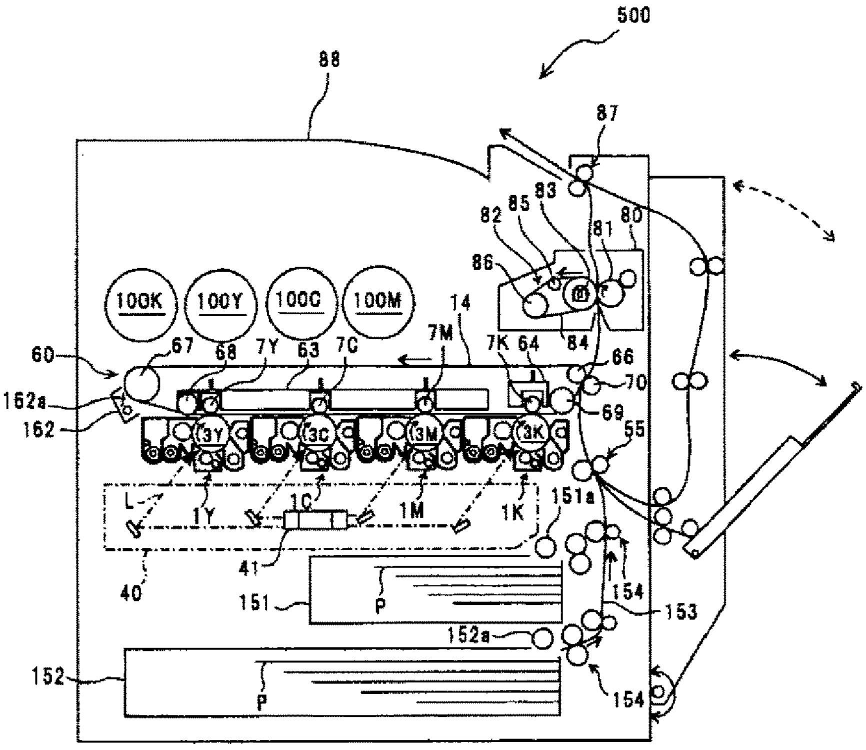

[Fig. 5]
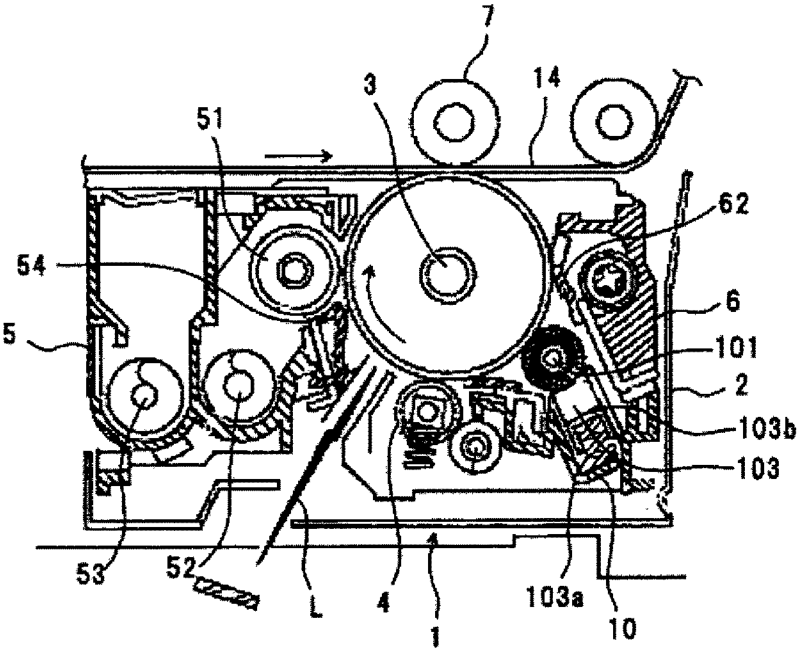
[Fig. 6]
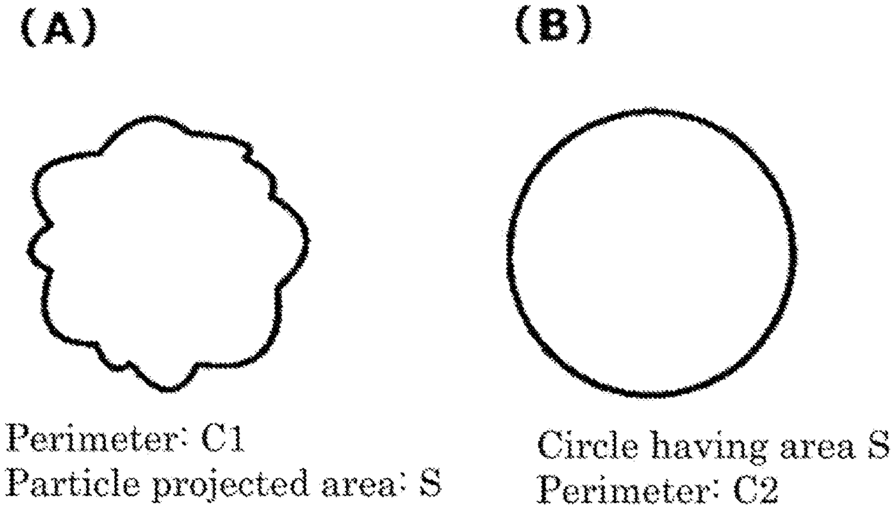
[Fig. 7]
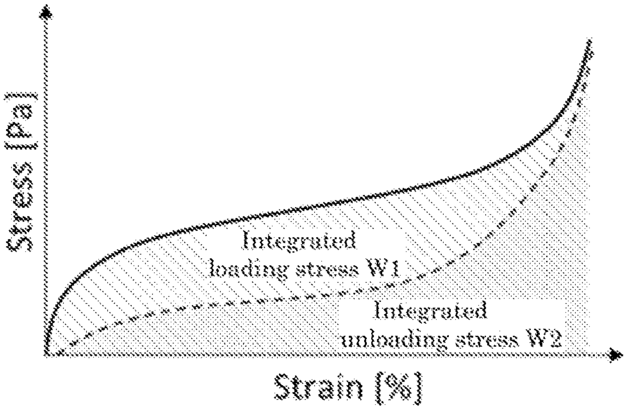

CLEANING BLADE, IMAGE FORMING APPARATUS, AND PROCESS CARTRIDGE

CROSS-REFERENCE TO RELATED APPLICATIONS

This application is based on PCT filing PCT/JP2022/010749, filed Mar. 10, 2022, which claims the priority to Japanese Patent Application No. 2021-069731, filed on Apr. 16, 2021, the entire contents of each are incorporated herein by reference.

TECHNICAL FIELD

The present disclosure relates to a cleaning blade, an image forming apparatus, and a process cartridge.

BACKGROUND ART

In existing electrophotographic image forming apparatuses, a cleaning unit removes any residual toner adhering to the surface of an image bearer (hereinafter, may be referred to as "cleaning target member"), from which a toner image has been transferred to a recording medium or an intermediate transfer medium in an image forming step. As the cleaning unit, a cleaning blade is used because a cleaning blade has a simple structure and an excellent cleaning performance. The cleaning blade typically includes an elastic member formed of, for example, a polyurethane rubber, and a supporting member. The cleaning blade, in which a base end of the elastic member is supported by the supporting member, presses a contact part (leading end ridgeline portion) of the elastic member against the surface of the image bearer, dams up any toner remaining on the surface of the image bearer, and scrapes off and removes the toner.

In recent years, energy-saving electrophotographic image forming apparatuses have been demanded, and low-melting-point toners have come to be used more often.

However, as illustrated in FIG. 1A, an existing polyurethane rubber cleaning blade 62 is pulled to the moving direction of the image bearer 123 due to an increasing frictional force between the image bearer 123 and the cleaning blade 62, and the contact part (leading end ridgeline portion) 62*c* of the cleaning blade 62 curls up. Moreover, if the cleaning blade 62 continues cleaning in the state that the contact part 62*c* curls up, a local wear X occurs at such a position of a leading end surface 62*a* of the cleaning blade 62 as apart from the contact part 62*c* by some micrometers, as illustrated in FIG. 1B. If the cleaning blade 62 further continues cleaning in this state, the local wear X grows and the contact part 62*c* chips away eventually as illustrated in FIG. 1C. If the contact part 62*c* chips away, there occurs a problem that the frictional force works more heavily and a cleaning failure occurs. A particular problem is that an external additive agent adheres to the image bearer.

In order to provide a cleaning blade configured to clean a polymerization toner having a small particle size appropriately even in a low-temperature, low-humidity environment, PTL 1 discloses a cleaning blade for an electrophotography apparatus, where the cleaning blade includes an elastic rubber member and a supporting member, and the elastic rubber member is formed of a material that has a dual or more multilayer structure including an edge layer and a layer other than the edge layer, and that satisfies a relationship B/A<0.5 between hysteresis losses due to deflection and bending load in a three-point bending test in which the edge layer faces upward. PTL 2 discloses a cleaning blade, where the modulus 100 of the surface layer of the elastic blade is set within a specific range.

The technique disclosed in PTL 1 has a problem that the elastic blade wears and becomes dysfunctional during an early stage of use because the technique is not sufficient for suppressing damages due to repetitive minor deformations of the elastic blade.

The technique disclosed in PTL 2 also has room for improvement in terms of suppression of wear of the elastic blade and cleaning performance on the cleaning target member.

CITATION LIST

Patent Literature

PTL 1: Japanese Unexamined Patent Application Publication No. 2008-268649

PTL 2: Japanese Unexamined Patent Application Publication No. 2014-85595

SUMMARY OF INVENTION

Technical Problem

The present disclosure has an object to provide a cleaning blade that suppresses wear of an elastic blade due to contact with a cleaning target member, suppresses a residual matter from slipping through the cleaning blade or adhering to the cleaning target member, and can be used for a long term.

Solution to Problem

According to an embodiment of the present disclosure, a cleaning blade includes an elastic blade having a strip shape, and a supporting member supporting the elastic blade. The cleaning blade is configured to bring a leading end ridgeline portion of the elastic blade into contact with a cleaning target member that is moving, and remove a residual matter from a surface of the cleaning target member. At least a surface layer portion of the elastic blade including the leading end ridgeline portion is formed of a rubber having a hysteresis loss ratio of 15% or less.

Advantageous Effects of Invention

The present disclosure can provide a cleaning blade that can be used for a long term by suppression of early-stage wear of an elastic blade due to contact with a cleaning target member, and by suppression of a residual matter from slipping through the cleaning blade or adhering to the cleaning target member.

BRIEF DESCRIPTION OF DRAWINGS

FIG. 1A is a schematic view illustrating an example of an existing cleaning blade.

FIG. 1B is a schematic view illustrating an example of an existing cleaning blade.

FIG. 1C is a schematic view illustrating an example of an existing cleaning blade.

FIG. 2A is a schematic view illustrating an example of a cleaning blade according to an embodiment of the present disclosure.

FIG. 2B is a schematic view illustrating an example of a cleaning blade according to an embodiment of the present disclosure.

FIG. 3 is a schematic view illustrating an example of a state in which a leading end ridgeline portion of an elastic blade is brought into contact with a cleaning target member.

FIG. 4 is a schematic view illustrating an example of a configuration of an image forming apparatus according to an embodiment of the present disclosure.

FIG. 5 is a view illustrating an example of a schematic configuration of one of four image forming units of an image forming apparatus.

FIG. 6 is a view illustrating an example of average circularity of a toner.

FIG. 7 is a concept graph illustrating an example of a hysteresis loss ratio.

DESCRIPTION OF EMBODIMENTS

As a result of earnest studies, the present inventors have found that an existing cleaning blade using a material having a high hysteresis loss ratio at the leading end ridgeline portion wears at a position slightly apart from the edge 62*c* as illustrated in FIG. 1B and significantly loses its cleaning ability during an early stage of use if the cleaning blade continues to be used in a deformed state illustrated in FIG. 1A, and allows any residual matter, such as a toner to slip through the cleaning blade, or allows the toner and an external additive agent to adhere to the cleaning target member.

The present disclosure can solve the problem described above with use of a material having a hysteresis loss ratio of 15% or less at the leading end ridgeline portion. An embodiment of the present disclosure will be described in detail below.

<Cleaning Target Member>

For example, the material, shape, structure, and size of the cleaning target member are not particularly limited and may be appropriately selected depending on the intended purpose. Examples of the shape of the cleaning target member include a drum shape, a belt shape, a flat plate shape, and a sheet shape. The size of the cleaning target member is not particularly limited, may be appropriately selected depending on the intended purpose, and is preferably a commonly used size.

The material of the cleaning target member is not particularly limited and may be appropriately selected depending on the intended purpose. Examples of the material of the cleaning target member include metals, plastics, and ceramic.

The cleaning target member is not particularly limited and may be appropriately selected depending on the intended purpose. Examples of the cleaning target member include an image bearer when the cleaning blade is used in an image forming apparatus.

<Residual Matter>

The residual matter is not particularly limited and may be appropriately selected depending on the intended purpose so long as the residual matter adheres to the surface of the cleaning target member and is suitable as a target to be removed by the cleaning blade. Examples of the residual matter include a toner, a lubricant, inorganic particles, organic particles, litter, and dust, or mixtures thereof.

The following description is based on an example in which an image bearer such as a photoconductor is used as the cleaning target member, and the residual matter is a toner. However, the present disclosure should not be construed as being limited to the example described below.

FIG. 2A and FIG. 2B are schematic views illustrating an example of a cleaning blade of the present disclosure.

As illustrated in FIG. 2A, the cleaning blade 62 includes a flat plate-shaped supporting member 621 formed of a stiff material such as a metal or a hard plastic, and a strip-shaped elastic blade 622. The elastic blade 622 is fixed on one end of the supporting member 621 with, for example, an adhesive agent. The other end of the supporting member 621 is cantilevered on a case of a cleaning device.

FIG. 3 is a schematic view illustrating a state in which a leading end ridgeline portion of the elastic blade 622 is brought into contact with the cleaning target member (for example, a photoconductor).

As illustrated in FIG. 3, the strip-shaped elastic blade 622 has a leading end ridgeline portion, which is a free end facing a photoconductor 3, at one side of the elastic blade 622. The cleaning blade 622 is configured to bring the leading end ridgeline portion into contact with the surface of the photoconductor 3, which is making a surface motion, and remove and clean a powder from the surface of the photoconductor 3.

The elastic blade 622 may be formed of a single layer as illustrated in FIG. 2A. The elastic blade 622 may be a laminate having a laminate structure including a base layer 6222 and a surface layer 6221 including the leading end ridgeline portion as illustrated in FIG. 2B.

For example, the shape, material, size, and structure of the base layer 6222 are not particularly limited and may be appropriately selected depending on the intended purpose. The size of the elastic blade 622 is not particularly limited and may be appropriately selected depending on the size of the cleaning target member.

The material of the elastic blade 622 is not particularly limited and may be appropriately selected depending on the intended purpose. For example, polyurethane rubbers and polyurethane elastomers are suitable because a high elasticity tends to be obtained.

The following method can be raised as a preferable method for producing the elastic blade 622.

First, a polyurethane prepolymer is prepared using a polyol compound and a polyisocyanate compound. Next, a curing agent, and as needed, a curing catalyst are added to the polyurethane prepolymer and stirred. Subsequently, the resultant is injected into a centrifugal molding device, and heated and crosslinked, to be molded into a cylindrical shape. The resultant is released from the mold, and partially cut to obtain a sheet shape. The sheet is stretched over a smooth place, left to stand at normal temperature, and aged. The resultant is cut into a strip shape having a predetermined dimension.

The polyol compound is not particularly limited and may be appropriately selected depending on the intended purpose. Examples of the polyol compound include high-molecular-weight polyols and low-molecular-weight polyols.

Examples of the high-molecular-weight polyols include: polyester polyols, which are condensates of alkylene glycols and aliphatic dibasic acids; polyester-based polyols such as polyester polyols of alkylene glycols and adipic acid, such as ethylene adipate ester polyol, butylene adipate ester polyol, hexylene adipate ester polyol, ethylene propylene adipate ester polyol, ethylene butylene adipate ester polyol, and ethylene neopentylene adipate ester polyol; polycaprolactone-based polyols such as polycaprolactone ester polyols obtained by ring-opening polymerization of caprolactone; and polyether-based polyols such as poly(oxytetramethylene)glycol and poly(oxypropylene)glycol. One of these high-molecular-weight polyols may be used alone or two or more of these high-molecular-weight polyols may be used in combination.

Examples of the low-molecular-weight polyols include: divalent alcohols such as 1,4-butanediol, ethylene glycol, neopentyl glycol, hydroquinonebis(2-hydroxyethyl)ether, 3,3'-dichloro-4,4'-diaminodiphenylmethane, and 4,4'-diaminodiphenylmethane; trivalent or higher polyvalent alcohols such as 1,1,1-trimethylolpropane, glycerin, 1,2,6-hexanetriol, 1,2,4-butanetriol, trimethylolethane, 1,1,1-tris(hydroxyethoxymethyl)propane, diglycerin, and pentaerythritol. One of these low-molecular-weight polyols may be used alone or two or more of these low-molecular-weight polyols may be used in combination.

The polyisocyanate compound is not particularly limited and may be appropriately selected depending on the intended purpose. Examples of the polyisocyanate compound include methylene diphenyl diisocyanate (MDI), tolylene diisocyanate (TDI), xylylene diisocyanate (XDI), naphthylene 1,5-diisocyanate (NDI), tetramethyl xylene diisocyanate (TMXDI), isophorone diisocyanate (IPDI), hydrogenated xylylene diisocyanate (H6XDI), dicyclohexylmethane diisocyanate (H12MDI), hexamethylene diisocyanate (HDI), dimer acid diisocyanate (DDI), norbornene diisocyanate (NBDI), and trimethyl hexamethylene diisocyanate (TMDI). One of these polyisocyanate compounds may be used alone or two or more of these polyisocyanate compounds may be used in combination.

The curing catalyst is not particularly limited and may be appropriately selected depending on the intended purpose. Examples of the curing catalyst include: secondary amines such as 2-methyl imidazole, and salts of the secondary amines; tertiary amines such as 1,2-dimethyl imidazole, triethylene diamine, and diazabicycloundecene, and salts of the tertiary amines; alkali metal organic acid salts such as potassium acetate and potassium octylate; and organic metal salts such as dibutyl tin dilaurate, bismuth carboxylate, and zirconium complexes.

The content of the curing catalyst is not particularly limited, may be appropriately selected depending on the intended purpose, and is preferably 0.01% by mass or greater but 0.5% by mass or less and more preferably 0.05% by mass or greater but 0.3% by mass or less.

The elastic blade 622 may have a single-layer structure or a laminate structure including two or more layers. The material of the present disclosure having a hysteresis loss ratio of 15% or less often has a low hardness. Here, a laminate structure in which a base layer is formed of a rubber having a high hardness and a surface layer is formed of the material having a hysteresis loss ratio of 15% or less is preferable, because such a laminate structure can suppress the leading end ridgeline portion from curing up more than needed, and can satisfy both of wear resistance and followability.

The JIS-A hardness of the surface layer including the leading end ridgeline portion is preferably 50 degrees or greater but 65 degrees or less, and the JIS-A hardness of the base layer is preferably 68 degrees or greater but 85 degrees or less. The JIS-A hardness of the base layer is more preferably 70 degrees or greater but 80 degrees or less. When the JIS-A hardness of the base layer is less than 68 degrees, it is harder to obtain a blade linear pressure, and a cleaning failure may occur. On the other hand, when the JIS-A hardness of the base layer is greater than 85 degrees, the base layer plastically deforms easily, the blade linear pressure degrades in a long-term sense, and a cleaning failure may occur.

The JIS-A hardness is measured according to JIS K6253, and can be measured with, for example, a micro rubber hardness meter MD-1 available from Kobunshi Keiki Co., Ltd.

When the hysteresis loss ratio of the surface layer is greater than 15%, the leading end ridgeline portion tends to undergo fatigue wear through repetitive deformations during use and lose the cleaning ability due to early-stage wear.

The hysteresis loss ratio is measured according to JIS K6400-2, and can be measured with, for example, a texture analyzer EZTEST available from Shimadzu Corporation.

Specifically, first, a single-layer rubber sample is processed into a dumbbell shape according to JIS K6251. The rubber sample is attached on the texture analyzer, extended (loaded) by 100% at a tensile speed stipulated by JIS K6251, for example, at a speed of 500 mm/min if the dumbbell shape is Type 1, and then returned (unloaded) to an extension degree of 0% at the same speed. The hysteresis loss ratio is calculated according to the formula below, where W1 represents an integrated value of loading stress and W2 represents an integrated value of unloading stress.

$$\text{Hysteresis loss ratio} = (W1 - W2)/W1\,[\%]$$

When the tan δ peak temperature of the surface layer is higher than 2 degrees C., the surface layer has a higher hardness and a higher hysteresis loss ratio in a low-temperature environment. Therefore, the surface layer tends to undergo early-stage wear in such an environment as a wintertime and degrade the cleaning ability.

The tan δ peak temperature can be measured using a strip-shaped sample, and using, for example, DMS6100 available from SII Nanotechnology Inc. under such conditions as a tensile mode, a frequency of 10 Hz, and a temperature elevation rate of 2 degrees C./min.

An amount of micro slurry-jet erosion (MSE) wear of the surface layer is effective as an index based on which the growing speed of abrasive wear, which occurs slightly due to a matter that slips through the cleaning blade even when the cleaning blade keeps its cleaning ability property, is measured. It has been found that when the amount of MSE wear is greater than 15 micrometers, wear growth becomes heavy suddenly at a certain point of time.

The amount of MSE wear can be measured under conditions that, for example, a slurry liquid obtained by dispersing alumina particles having a particle diameter of 1 micrometer in water at a mass concentration of 3% is projected by 100 g using a MSE tester available from Palmeso Co., Ltd. onto a smooth portion of a cleaning blade rubber at a speed of 100 m/sec at a projection rate of 2 g/min, and the depth of wear is measured with a laser microscope (e.g., LEXT OLS4100 available from Olympus Corporation).

When the Martens hardness of the surface layer is less than 0.45 N/mm$^2$, the leading end ridgeline portion may be withdrawn excessively, and the cleaning ability may be degraded. On the other hand, when the Martens hardness of the surface layer is greater than 0.75 N/mm$^2$, the hysteresis loss ratio is typically greater than 15%. This is undesirable.

The Martens hardness can be measured using an ultra microhardness tester HM-2000 available from Fischer Instruments K.K. under conditions that, for example, a Vickers indenter is indented into the surface of the sample at a force of 9.8 mN for 30 seconds, retained there for 5 seconds, and pulled out at a force of 9.8 mN in 30 seconds.

The average thickness of the elastic blade 622 is not particularly limited, may be appropriately selected depending on the intended purpose, and is preferably 1.0 mm or greater but 3.0 mm or less.

<Supporting Member>

For example, the shape, size, and material of the supporting member 621 are not particularly limited and may be appropriately selected depending on the intended purpose. Examples of the shape of the supporting member 621 include a flat plate shape, a strip shape, and a sheet shape. The size of the supporting member 621 is not particularly limited and may be appropriately selected depending on the size of the cleaning target member.

Examples of the material of the supporting member 621 include metals, plastics, and ceramic. Among these materials, metal plates are preferable in terms of strength, and steel plates of, for example, stainless steel, aluminum plates, and phosphor-bronze plates are particularly preferable.

The cleaning blade of the present disclosure can maintain a good cleaning ability for a long term because curling of the contact part of the leading end ridgeline portion contacting the surface of the cleaning target member, and wear and chipping of the contact part of the leading end ridgeline portion during use are suppressed. Therefore, the cleaning blade of the present disclosure can be used widely in various fields. Particularly, the cleaning blade of the present disclosure can be suitably used in an image forming apparatus, an image forming method, and a process cartridge described below.

(Image Forming Apparatus and Image Forming Method)

An image forming apparatus of the present disclosure includes at least an image bearer, a charging unit, a light exposure unit, a developing unit, a transfer unit, a fixing unit, and a cleaning unit, and further includes other units appropriately selected as needed. The charging unit and the light exposure unit may be collectively referred to as electrostatic latent image forming unit.

An image forming method performed by the image forming apparatus of the present disclosure includes at least a charging step, a light exposure step, a developing step, a transfer step, a fixing step, and a cleaning step, and further includes other steps appropriately selected as needed. The charging step and the light exposure step may be collectively referred to as electrostatic latent image forming step.

The charging step can be performed by the charging unit. The light exposure step can be performed by the light exposure unit. The developing step can be performed by the developing unit. The transfer unit can be performed by the transfer unit. The fixing step can be performed by the fixing unit. The cleaning step can be performed by the cleaning unit. The other steps can be performed by the other units.

For example, the material, shape, structure, and size of the image bearer (hereinafter may be referred to as "electrophotographic photoconductor" or "photoconductor") are not particularly limited and may be appropriately selected from known attributes. Examples of the shape of the image bearer include a drum shape and a belt shape. Examples of the material of the image bearer include inorganic photoconductors such as amorphous silicon and selenium, and organic photoconductors (OPC) such as polysilane and phthalopolymethine.

<Charging Step and Charging Unit>

The charging step is a step of electrically charging the surface of the image bearer, and is performed by the charging unit.

It is possible to perform charging by, for example, applying a voltage to the surface of the image bearer, using the charging unit.

The charging unit is not particularly limited and may be appropriately selected depending on the intended purpose. Examples of the charging unit include known contact chargers including, for example, a conductive or semiconductor roller, brush, film, or rubber blade, and contactless chargers using corona discharge, such as a corotron and a scorotron.

The charging unit may have any form such as a roller, a magnetic brush, and a fur brush. The form of the charging unit may be selected depending on the specifications and form of the electrophotographic image forming apparatus. When using a magnetic brush, the magnetic brush is formed of various ferrite particles such as Zn—Cu ferrite serving as a charging unit, a nonmagnetic conductive sleeve on which the ferrite particles are supported, and a magnet roll enclosed within the sleeve. When using a fur brush, a fur treated to have conductivity using carbon, copper sulfide, a metal, or a metal oxide is used as the material of the fur brush, and the fur is wound around or pasted on a cored bar treated to have conductivity using a metal or any other substance, to constitute a charger.

The charger is not limited to the contact charger described above, but the contact charger is advantageous in that an image forming apparatus that will emit less ozone from the charger can be obtained.

It is preferable that the charger be disposed in contact with or contactlessly from the image bearer and configured to electrically charge the surface of the image bearer by applying DC and AC voltages superimposed with each other.

It is preferable that the charger be a charging roller having a gap tape and disposed contactlessly adjacently to the image bearer, and configured to electrically charge the surface of the image bearer when DC and AC voltages superimposed with each other are applied to the charging roller.

<Light Exposure Step and Light Exposure Unit>

The light exposure step is a step of exposing the charged surface of the image bearer to light, and is performed by the light exposure unit.

It is possible to perform light exposure by, for example, exposing the surface of the image bearer to light imagewise, using the light exposure unit.

The optical systems involved in the light exposure are roughly classified into analog optical systems and digital optical systems.

The analog optical systems are optical systems configured to project an original image directly on the image bearer through optical systems. The digital optical system are optical systems configured to receive image information in the form of an electric signal, convert the electric signal to a light signal, and expose the electrophotographic photoconductor to the light signal to form an image.

The light exposure unit is not particularly limited and may be appropriately selected depending on the intended purpose so long as the light exposure unit can expose the surface of the image bearer charged by the charging unit to light in an imagewise manner as the desired image. Examples of the light exposure unit include various light exposure units such as a copier optical system, a rod lens array system, a laser optical system, a liquid crystal shutter optical system, and a LED optical system.

In the present disclosure, a back exposure system configured to expose the back surface of the image bearer to light imagewise may be employed.

<Developing Step and Developing Unit>

The developing step is a step of developing the electrostatic latent image with a toner to form a visible image.

It is possible to form the visible image by, for example, developing the electrostatic latent image with the toner. This can be performed by the developing unit.

The developing unit is not particularly limited and may be appropriately selected from known developing units so long as the developing unit can develop an image with the toner. Preferable examples of the developing unit include a developing unit including a developing device storing the toner and capable of applying the toner to the electrostatic latent image in a contact manner or contactlessly.

The developing device may be a dry developing type or a wet developing type, and may be a single-color developing device or a multi-color developing device. Preferable examples of the developing device include a developing device including: a stirrer configured to stir the toner frictionally and charge the toner; and a rotatable magnet roller.

In the developing device, for example, the toner, and as needed, a carrier are mixed and stirred, and the resulting friction gets the toner charged and held on the surface of the rotating magnet roller in a chain-like fashion, to form a magnetic brush. Because the magnet roller is disposed near the image bearer, the toner constituting the magnetic brush formed on the surface of the magnet roller is partially removed to the surface of the image bearer by an electric attractive force. As a result, the electrostatic latent image is developed by the toner, and a visible image formed of the toner is formed on the surface of the image bearer.

The toner to be stored in the developing device may be a developer containing the toner. The developer may be a one-component developer or a two-component developer.

—Toner—

The toner contains toner base particles and an external additive, and further contains other components as needed.

The toner may be a monochrome toner or a color toner.

The toner base particles contain at least a binder resin and a colorant, and contains other components such as a release agent and a charge controlling agent as needed.

—Binder Resin—

The binder resin is not particularly limited and may be appropriately selected depending on the intended purpose. Examples of the binder resin include homopolymers of styrene or of substitutes of styrene, such as polystyrene resins and polyvinyl toluene resins, styrene-p-chlorostyrene copolymers, styrene-propylene copolymers, styrene-vinyl toluene copolymers, styrene-methyl acrylate copolymers, styrene-ethyl acrylate copolymers, styrene-butyl acrylate copolymers, styrene-methyl methacrylate copolymers, styrene-ethyl methacrylate copolymers, styrene-butyl methacrylate copolymers, styrene-methyl $\alpha$-chloromethacrylate copolymers, styreneacrylonitrile copolymers, styrene-vinyl methyl ether copolymers, styrene-methyl vinyl ketone copolymers, styrene-butadiene copolymers, styrene-isoprene copolymers, styrene-maleic acid copolymers, styrene-maleate copolymers, polymethyl methacrylate, polybutyl methacrylate, polyvinyl chloride resins, polyvinyl acetate resins, polyethylene resins, polypropylene resins, polyester resins, polyurethane resins, epoxy resins, polyvinyl butyral resins, polyacrylic acid resins, rosin, modified rosin, terpene resins, phenol resins, aliphatic hydrocarbons, aromatic petroleum resins, chlorinated paraffins, and paraffin waxes. One of these binder resins may be used alone or two or more of these binder resins may be used in combination. Among these binder resins, polyester resins are particularly preferable because polyester resins can suppress the melt viscosity of the toner while ensuring the toner storage stability, compared with styrene-based resins and acrylic-based resins.

The polyester resin can be obtained through, for example, a polycondensation reaction between an alcohol component and a carboxylic acid component.

The alcohol component is not particularly limited and may be appropriately selected depending on the intended purpose. Examples of the alcohol component include: diols such as polyethylene glycol, diethylene glycol, triethylene glycol, 1,2-propylene glycol, 1,3-propylene glycol, 1,4-propylene glycol, neopentyl glycol, and 1,4-butenediol; etherified bisphenols such as 1,4-bis(hydroxymethyl)cyclohexane, bisphenol A, hydrogenated bisphenol A, polyoxyethylenated bisphenol A, and poly-oxypropylenated bisphenol A; divalent alcohol monomers obtained by substituting a saturated or unsaturated hydrocarbon group containing from 3 through 22 carbon atoms for these alcohol components; other divalent alcohol monomers; trivalent or higher polyvalent alcohol monomers such as sorbitol, 1,2,3,6-hexanetetrol, 1,4-sorbitan, pentaerythritol, dipentaerythritol, tripentaerythritol, sucrose, 1,2,4-butanetriol, 1,2,5-pentanetriol, glycerol, 2-methyl-propanetriol, 2-methyl-1,2,4-butanetriol, trimethylolethane, trimethylolpropane, and 1,3,5-trihydroxymethyl benzene.

The carboxylic acid component is not particularly limited and may be appropriately selected depending on the intended purpose. Examples of the carboxylic acid component include: monocarboxylic acids such as palmitic acid, stearic acid, and oleic acid; maleic acid, fumaric acid, mesaconic acid, citraconic acid, terephthalic acid, cyclohexane dicarboxylic acid, succinic acid, adipic acid, sebacic acid, and malonic acid, divalent organic acid monomers obtained by substituting a saturated or unsaturated hydrocarbon group containing from 3 through 22 carbon atoms for these acids, anhydrides of these acids, and dimer acid formed of lower alkyl ester and linolenic acid; and 1,2,4-benzene tricarboxylic acid, 1,2,5-benzene tricarboxylic acid, 2,5,7-naphthalene tricarboxylic acid, 1,2,4-naphthalene tricarboxylic acid, 1,2,4-butane tricarboxylic acid, 1,2,5-hexane tricarboxylic acid, 3,3-dicarboxymethyl butanoic acid, tetracarboxymethyl methane, and 1,2,7,8-octane tetracarboxylic acid empol trimer acid, and trivalent or higher polyvalent carboxylic acid monomers such as anhydrides of these acids.

—Colorant—

The colorant is not particularly limited and may be appropriately selected from known dyes and pigments depending on the intended purpose. Examples of the colorant include carbon black, nigrosine dyes, iron black, naphthol yellow S, Hansa yellow (10G, 5G, G), cadmium yellow, yellow iron oxide, yellow ocher, chrome yellow, titanium yellow, polyazo yellow, oil yellow, Hansa yellow (GR, A, RN, R), Pigment Yellow L, benzidine yellow (G, GR), permanent yellow (NCG), vulcan fast yellow (5G, R), tartrazine lake, quinoline yellow lake, anthrazane yellow BGL, isoindolinone yellow, red iron oxide, minium, lead vermillion, cadmium red, cadmium mercury red, antimony vermillion, permanent red 4R, para red, Fiser red, parachloroorthonitroaniline red, lithol fast scarlet G, brilliant fast scarlet, brilliant carmine BS, permanent red (F2R, F4R, FRL, FRLL, F4RH), fast scarlet VD, vulcan fast rubin B, brilliant scarlet G, lithol rubin GX, permanent red F5R, brilliant carmine 6B, pigment scarlet 3B, Bordeaux 5B, toluidine maroon, permanent Bordeaux F2K, Helio Bordeaux BL, Bordeaux 10B, BON maroon light, BON marron medium, eosin lake, Rhodamine lake B, Rhodamine lake Y, alizarin lake, thioindigo red B, thioindigo maroon, oil red, quinacridone red, pyrazolone red, polyazo red, chrome vermillion, benzidine orange, perinone orange, oil orange, cobalt blue, cerulean blue, alkali blue lake, peacock blue lake, Victoria blue lake, metal-free phthalocyanine blue, phthalocyanine blue, fast sky blue, indanthrene blue (RS, BC), indigo, ultramarine, Prussian blue, anthraquinone blue, fast violet B, methyl violet lake, cobalt purple, manganese purple, dioxane violet, anthraquinone violet, chrome green, zinc green, chromium oxide, viridian, emerald green, Pigment Green B, naphthol green B, green gold, acid green lake, malachite green lake, phthalocyanine green, anthraquinone green, titanium oxide, zinc oxide, and lithopone. One of these colorants may be used alone or two or more of these colorants may be used in combination.

The content of the colorant in the toner is not particularly limited, may be appropriately selected depending on the intended purpose, and is preferably 1% by mass or greater but 15% by mass or less and more preferably 3% by mass or greater but 10% by mass or less.

The colorant may be used in the form of a master batch, which is a composite of the colorant with a resin.

The resin is not particularly limited and may be appropriately selected from known resins depending on the intended purpose. Examples of the resin include polymers of styrene or of substitutes of styrene, styrene-based copolymers, polymethyl methacrylate resins, polybutyl methacrylate resins, polyvinyl chloride resins, polyvinyl acetate resins, polyethylene resins, polypropylene resins, polyester resins, epoxy resins, epoxy polyol resins, polyurethane resins, polyamide resins, polyvinyl butyral resins, polyacrylic acid resins, rosin, modified rosin, terpene resins, aliphatic hydrocarbon resins, alicyclic hydrocarbon resins, aromatic petroleum resins, chlorinated paraffins, and paraffins. One of these resins may be used alone or two or more of these resins may be used in combination.

—Release Agent—

The release agent is not particularly limited and may be appropriately selected depending on the intended purpose. Examples of the release agent include waxes. Example of the waxes include carbonyl group-containing waxes, polyolefin waxes, long-chain hydrocarbons. One of these waxes may be used alone or two or more of these waxes may be used in combination. Among these waxes, carbonyl group-containing waxes are preferable.

Examples of the carbonyl group-containing waxes include polyalkanates, polyalkanol esters, polyalkanic acid amides, polyalkyl amides, and dialkyl ketones. Examples of the polyalkanates include carnauba waxes, montan waxes, trimethylolpropane tribehenate, pentaerythritol tetrabehenate, pentaerythritol diacetate dibehenate, glycerin tribehenate, and 1,18-octadecanediol distearate. Examples of the polyalkanol esters include tristearyl trimellitate and distearyl maleate. Examples of the polyalkanic acid amides include dibehenyl amide. Examples of the polyalkyl amides include trimellitic acid tristearyl amide. Examples of the dialkyl ketones include distearyl ketone. Among these carbonyl group-containing waxes, polyalkanates are particularly preferable. Examples of the polyolefin waxes include polyethylene waxes and polypropylene waxes.

Examples of the long-chain hydrocarbons include paraffin waxes and sasol waxes. The content of the release agent in the toner is not particularly limited, may be appropriately selected depending on the intended purpose, and is preferably 5% by mass or greater but 15% by mass or less.

—Charge Controlling Agent—

The charge controlling agent is not particularly limited and may be appropriately selected depending on the intended purpose. Examples of the charge controlling agent include nigrosine-based dyes, triphenyl methane-based dyes, chromium-containing metal complex dyes, molybdic acid chelate pigments, Rhodamine-based dyes, alkoxy-based amines, quaternary ammonium salts (including fluorine-modified quaternary ammonium salts), alkyl amides, phosphorus or phosphorus compounds, tungsten or tungsten compounds, fluorine-based activators, salicylic acid metal salts, and metal salts of salicylic acid derivatives.

The content of the charge controlling agent is not particularly limited, may be appropriately selected depending on the intended purpose, and is preferably 0.1 parts by mass or greater but 10 parts by mass or less and more preferably 0.2 parts by mass or greater but 5 parts by mass or less relative to 100 parts by mass of the toner.

—External Additive—

The external additive is not particularly limited and may be appropriately selected depending on the intended purpose so long as the external additive contain at least silica particles. The external additive may contain: inorganic particles of, for example, silica, titanium oxide, alumina, silicon carbide, silicon nitride, and boron nitride; and resin particles such as polymethyl methacrylate particles and polystyrene particles obtained by soap-free emulsion polymerization method and having an average particle diameter of 0.05 micrometers or greater but 1 micrometer or less. One kind selected from these inorganic particles and resin particles may be used alone or two or more kinds selected from these inorganic particles and resin particles may be used in combination. Among these inorganic particles and resin particles, silica having a hydrophobized surface is particularly preferable.

Examples of the silica include silicone-treated silica. The silicone-treated silica is silica of which surface is surface-treated (hydrophobized) with a silicone oil.

The method for the surface treatment is not particularly limited and may be appropriately selected depending on the intended purpose.

Examples of the silicone oil include dimethyl silicone oils, methyl hydrogen silicone oils, and methyl phenyl silicone oils.

A commercially available product may be used as the silicone-treated silica. Examples of the commercially available product include RY200, R2T200S, NY50, and RY50 (all available from Nippon Aerosil Co., Ltd.).

—Other Components—

The other components of the toner are not particularly limited and may be appropriately selected depending on the intended purpose. Examples of the other components include a fluidity improver, a cleanability improver, a magnetic material, and a metal soap.

The fluidity improver improves hydrophobicity through a surface treatment, and enables prevention of degradation of fluidity and chargeability even in a high-humidity environment. Examples of the fluidity improver include silane coupling agents, silylation agents, silane coupling agents containing an alkyl fluoride group, organic titanate-based coupling agents, aluminum-based coupling agents, silicone oils, and modified silicone oils.

The cleanability improver is added to the toner in order to remove any toner remaining on the image bearer or an intermediate transfer medium after transfer. Examples of the cleanability improver include: aliphatic acid metal salts such as zinc stearate, calcium stearate, and stearic acid; and polymer particles produced by soap-free emulsion polymerization, such as polymethyl methacrylate particles and polystyrene particles. As the polymer particles, particles having a relatively narrow particle size distribution are preferable, and particles having a volume average particle diameter of 0.01 micrometers or greater but 1 micrometer or less are preferable.

The magnetic material is not particularly limited and may be appropriately selected depending on the intended purpose. Examples of the magnetic material include an iron powder, magnetite, and ferrite. Among these magnetic materials, white magnetic materials are preferable in terms of color tone.

—Method for Producing Toner—

The method for producing the toner is not particularly limited and may be appropriately selected from known toner producing methods depending on the intended purpose. Examples of the method include a kneading pulverizing method, a polymerization method, a dissolution suspension method, and a spray granulation method.

Among these methods, polymerization methods such as a suspension polymerization method, an emulsion polymerization method, and a dispersion polymerization method that can produce a toner having a high circularity and a small particle diameter are preferable in order to improve image qualities.

—Kneading Pulverizing Method—

The kneading pulverizing method is a method of, for example, melting and kneading toner materials including at least a binder resin and a colorant, and pulverizing and classifying the obtained kneaded product, to produce base particles of the toner.

In the melting and kneading, the toner materials are mixed, and the mixture is fed to a melt kneader to be melted and kneaded. As the melt kneader, for example, a uniaxial or biaxial continuous kneader or a roll mill batch-type kneader can be used. For example, a KTK-type biaxial extruder available from Kobe Steel, Ltd., a TEM-type extruder available from Toshiba Machine Co., Ltd., a biaxial extruder available from KCK Engineering Co., Ltd., a PCM-type biaxial extruder available from Ikegai Corp., and a co-kneader available from Buss AG can be suitably used. It is preferable to perform the melting and kneading under appropriate conditions under which the molecular chains of the binder resin would not be disconnected. Specifically, the melt kneading temperature is set based on the softening point of the binder resin. When the melt kneading temperature is excessively higher than the softening point, the molecular chains may be disconnected severely. When the melt kneading temperature is excessively lower than the softening point, dispersion may not proceed.

In the pulverization, the kneaded product obtained in the melting and kneading is pulverized. In the pulverization, it is preferable to coarsely pulverize the kneaded product first, and minutely pulverize the kneaded product next. Here, it is preferable to employ a method of pulverizing the kneaded product by making the kneaded product impinge on an impact plate in a jet stream, a method of pulverizing the kneaded product by making particles of the kneaded product impinge on each other in a jet stream, and a method of pulverizing the kneaded product in a narrow gap between a rotor and a stator that are rotating mechanically.

In the classification, the pulverized product obtained in the pulverization is classified and adjusted to particles having a predetermined particle diameter. It is possible to perform classification by removing minute particles with, for example, a cyclone, a decanter, and a centrifuge.

After the pulverization and the classification are completed, the pulverized product is classified in an air stream by, for example, a centrifugal force. In this way, toner base particles having a predetermined particle diameter can be produced.

Next, the external additive is externally added to the toner base particles. When the toner base particles and the external additive are mixed and stirred using a mixer, the surfaces of the toner base particles are coated with the external additive while the external additive is being pulverized. Here, in terms of durability, it is important to attach the external additive such as silica particles uniformly and firmly to the toner base particles.

—Polymerization Method—

In the method for producing a toner by the polymerization method, for example, toner materials including at least a modified polyester-based resin that may form a urea or urethane bond, and a colorant are dissolved or dispersed in an organic solvent. Then, the dissolved or dispersed product is dispersed in an aqueous medium and allowed to undergo a polyaddition reaction. The solvent of the dispersion liquid is removed, and the resultant is washed. In this way, a toner is obtained.

Examples of the modified polyester-based resin that may form a urea or urethane bond include an isocyanate group-containing polyester prepolymer obtained by allowing, for example, a carboxyl group or a hydroxyl group at an end of polyester to undergo a reaction with a polyvalent isocyanate compound (PIC). Through a reaction between the polyester prepolymer and, for example, an amine, the molecular chain of the polyester prepolymer undergoes either or both of crosslinking and elongation. A modified polyester resin obtained as a result can improve the hot offset property while maintaining low-temperature fixability.

Examples of the polyvalent isocyanate compound (PIC) include aliphatic polyvalent isocyanates (e.g., tetramethylene diisocyanate, hexamethylene diisocyanate, and 2,6-diisocyanatomethyl caproate); alicyclic polyisocyanates (e.g., isophorone diisocyanate and cyclohexylmethane diisocyanate); aromatic diisocyanates (e.g., tolylene diisocyanate and diphenylmethane diisocyanate); aromatic aliphatic diisocyanates (e.g., α,α,α',α'-tetramethyl xylylene diisocyanate); isocyanates; and products obtained by blocking the polyisocyanates with, for example, phenol derivatives, oxime, and caprolactam. One of these polyvalent isocyanate compounds may be used alone or two or more of these polyvalent isocyanate compounds may be used in combination.

The ratio of the polyvalent isocyanate compound (PIC) is not particularly limited and may be appropriately selected depending on the intended purpose. The equivalent ratio [NCO]/[OH] of isocyanate group [NCO] to hydroxyl group [OH] of a hydroxyl group-containing polyester is preferably from 5/1 through 1/1, more preferably from 4/1 through 1.2/1, and yet more preferably from 2.5/1 through 1.5/1.

The number of isocyanate groups contained per molecule of the isocyanate group-containing polyester prepolymer (A) is not particularly limited, may be appropriately selected depending on the intended purpose, and is preferably 1 or greater, more preferably from 1.5 through 3 on the average, and yet more preferably from 1.8 through 2.5 on the average.

Examples of the amine (B) that is allowed to undergo a reaction with the polyester prepolymer include divalent amine compounds (B1), trivalent or higher polyvalent amine compounds (B2), amino alcohols (B3), aminomercaptan (B4), amino acids (B5), and products (B6) obtained by blocking the amino groups of B1 to B5.

Examples of the divalent amine compounds (B1) include aromatic diamines (e.g., phenylene diamine, diethyl toluene diamine, and 4,4'-diaminodiphenyl methane); alicyclic diamines (e.g., 4,4'-diamino-3,3'-dimethyl dicyclohexyl methane, diamine cyclohexane, and isophorone diamine); and aliphatic diamines (e.g., ethylene diamine, tetramethylene diamine, and hexamethylene diamine).

Examples of the trivalent or higher polyvalent amine compounds (B2) include diethylene triamine and triethylene tetramine.

Examples of the amino alcohols (B3) include ethanol amine and hydroxyethyl aniline.

Examples of the aminomercaptan (B4) include aminoethyl mercaptan and aminopropyl mercaptan.

Examples of the amino acids (B5) include aminopropionic acid and aminocaproic acid.

Examples of the products (B6) obtained by blocking the amino groups of B1 to B5 include ketimine compounds obtained from amines of B1 to B5 and ketones (e.g., acetone, methyl ethyl ketone, and methyl isobutyl ketone), and oxazolidine compounds. Among these amines (B), B1, and mixtures of B1 and a small amount of B2 are particularly preferable.

The ratio of the amine (B) is not particularly limited and may be appropriately selected depending on the intended purpose. The equivalent ratio [NCO]/[NHx] of the isocyanate group [NCO] in the isocyanate group-containing polyester prepolymer (A) to the amino group [NHx] in the amine (B) is preferably from 1/2 through 2/1, more preferably from 1.5/1 through 1/1.5, and yet more preferably from 1.2/1 through 1/1.2.

The method for producing a toner by the polymerization method described above can produce a toner having a small particle diameter and a spherical shape with low environmental impact at low costs.

The disperser for the dispersing is not particularly limited and may be appropriately selected depending on the intended purpose. Examples of the disperser include a low-speed shear disperser, a high-speed shear disperser, a frictional disperser, a high-pressure jet disperser, and an ultrasonic disperser.

Among these dispersers, a high-speed shear disperser is preferable because a high-speed shear disperser can control the particle diameter of a dispersion (oil droplets) to 2 micrometers or greater but 20 micrometers or less.

When using the high-speed shear disperser, conditions such as a rotation number, a dispersion time, and a dispersion temperature may be appropriately selected depending on the intended purpose.

The rotation number is not particularly limited, may be appropriately selected depending on the intended purpose, and is preferably 1,000 rpm or greater but 30,000 rpm or less and more preferably 5,000 rpm or greater but 20,000 rpm or less. The dispersion time is not particularly limited, may be appropriately selected depending on the intended purpose, and is preferably 0.1 minutes or longer but 5 minutes or shorter for a batch type.

The dispersion temperature is not particularly limited, may be appropriately selected depending on the intended purpose, and is preferably 0 degrees C. or higher but 150 degrees C. or lower and more preferably 40 degrees C. or higher but 98 degrees C. or lower under pressurization. In general, dispersing is easier at a higher dispersion temperature.

The amount of an aqueous medium to be used when dispersing the toner materials in the aqueous medium is not particularly limited, may be appropriately selected depending on the intended purpose, and is preferably 50 parts by mass or greater but 2,000 parts by mass or less and more preferably 100 parts by mass or greater but 1,000 parts by mass or less relative to 100 parts by mass of the toner materials.

The method for removing the organic solvent from the dispersion liquid is not particularly limited and may be appropriately selected depending on the intended purpose. Examples of the method include a method of elevating the temperature of the whole reaction system gradually and evaporating the organic solvent in the oil droplets, and a method of spraying the dispersion liquid to a dry atmosphere and removing the organic solvent in the oil droplets.

When the organic solvent is removed, toner base particles are formed. The toner base particles may be subjected to, for example, washing and drying, and further to, for example, classification. It is possible to perform the classification by removing minute particles with, for example, a cyclone, a decanter, and centrifugation in the liquid, or the classification may be performed after drying.

The toner base particles obtained may be mixed with particles of the external additive, and as needed, for example, the charge controlling agent. Here, application of a mechanical impact can suppress detachment of the particles of, for example, the external additive from the surfaces of the toner base particles.

The method for applying the mechanical impact is not particularly limited and may be appropriately selected depending on the intended purpose. Examples of the method include a method of applying an impact to the mixture using a blade rotating at a high speed, and a method of feeding the mixture to a high-speed air stream and accelerating the mixture to make the particles impinge on each other or make the particles impinge on an appropriate impact plate.

The device used in the method is not particularly limited and may be appropriately selected depending on the intended purpose. Examples of the device include ONG-MILL (available from Hosokawa Micron Corporation), an I-type mill (available from Nippon Pneumatic Mfg. Co., Ltd.) remodeled to have a lower pulverization air pressure, a hybridization system (available from Nara Machinery Co., Ltd.), a KRYPTRON system (available from Kawasaki Heavy Industries, Ltd.), and an automatic mortar.

The average circularity of the toner is not particularly limited, may be appropriately selected depending on the intended purpose, and is preferably 0.97 or greater and more preferably 0.97 or greater but 0.98 or less. When the average circularity is less than 0.97, the toner may not have a satisfactory transferability, or a high-quality image having no dust particles may not be obtained.

The average circularity of the toner can be measured with, for example, a flow-type particle image analyzer FPIA-1000 available from Sysmex Corporation.

The volume average particle diameter of the toner is not particularly limited, may be appropriately selected depending on the intended purpose, and is preferably 5.5 micrometers or less.

The ratio (Dv/Dn) of the volume average particle diameter (Dv) to a number average particle diameter (Dn) is not particularly limited, may be appropriately selected depending on the intended purpose, and is preferably 1.00 or greater but 1.40 or less. A ratio (Dv/Dn) closer to 1.00 represents a sharper particle diameter distribution. The toner having such a small particle diameter and narrow particle diameter distribution has a uniform charge level distribution and can produce a high-quality image with little background fogging, and the transfer ratio of the toner in an electrostatic transfer method is high.

The volume average particle diameter and the particle size distribution of the toner can be measured with, for example, a Coulter counter TA-II and a Coulter multisizer (both available from Beckman Coulter Inc.), which are toner particle size distribution measuring instruments based on a Coulter counter method.

The toner may be mixed with a magnetic carrier and used as a two-component developer. In this case, the mass ratio between the carrier and the toner in the two-component developer is not particularly limited and may be appropriately selected depending on the intended purpose. One part by mass or greater but 10 parts by mass or less of the toner relative to 100 parts by mass of the carrier is preferable. Examples of the magnetic carrier include iron powder, ferrite powder, magnetite powder, and magnetic resin carriers having a particle diameter of about 20 micrometers or greater but 200 micrometers or less.

The coating resin is not particularly limited and may be appropriately selected depending on the intended purpose. Examples of the coating resin include: halogenated olefin resins such as urea-formaldehyde resins, melamine resins, benzoguanamine resins, urea resins, polyamide resins, epoxy resins, polyvinyl and polyvinylidene-based resins, acrylic resins, polymethyl methacrylate resins, polyacrylonitrile resins, polyvinyl acetate resins, polyvinyl alcohol resins, polyvinyl butyral resins, polystyrene resins, styrene-acrylic copolymer resins, and polyvinyl chloride; polyester-based resins such as polyethylene terephthalate resins and polybutylene terephthalate resins; and polycarbonate-based resins, polyethylene resins, polyvinyl fluoride resins, polyvinylidene fluoride resins, polytrifluoroethylene resins, polyhexafluoropropylene resins, copolymers of vinylidene fluoride and acrylic monomers, copolymers of vinylidene fluoride and vinyl fluoride, fluoroterpolymers of tetrafluoroethylene, vinylidene fluoride, and a nonfluorinated monomer, and silicone resins.

For example, a conductive powder may be added in the coating resin as needed. Examples of the conductive powder include metal powders, carbon black, titanium oxide, tin oxide, and zinc oxide. The average particle diameter of these conductive powders is preferably 1 micrometer or less. When the average particle diameter of the conductive powder is greater than 1 micrometer, it may be difficult to control electric resistance.

The toner can also be used as a one-component magnetic toner or nonmagnetic toner that are free of a carrier.

<Transfer Step and Transfer Unit>

The transfer step is a step of transferring the visible image to a recording medium. In a preferable mode, an intermediate transfer medium is used, and the visible image is primarily transferred to the intermediate transfer medium, and subsequently secondarily transferred to the recording medium. A more preferable mode includes a primary transfer step of transferring a visible image to an intermediate transfer medium using two or more colors of toners, preferably full-color toners, to form a composite transferred image, and a secondary transfer step of transferring the composite transfer image to a recording medium.

It is possible to perform transfer by, for example, charging the visible image on the image bearer, using the transfer unit. This can be performed by the transfer unit. In a preferable mode, the transfer unit includes a primary transfer unit configured to transfer the visible image to the intermediate transfer medium to form a composite transferred image, and a secondary transfer unit configured to transfer the composite transferred image to a recording medium.

The intermediate transfer medium is not particularly limited and may be appropriately selected from known transfer media depending on the intended purpose. Examples of the intermediate transfer medium include a transfer belt.

It is preferable that the transfer unit (the primary transfer unit and the secondary transfer unit) include at least a transfer device configured to charge the visible image formed on the image bearer in a manner to be peeled to the recording medium side. One transfer unit may be used or two or more transfer units may be used. Examples of the transfer device include a corona transfer device using a corona discharge, a transfer belt, a transfer roller, a pressure transfer roller, and an adhesive transfer device.

A representative example of the recording medium is plain paper. However, the recording medium is not particularly limited and may be appropriately selected depending on the intended purpose so long as an unfixed developed image can be transferred to the recording medium. For example, a PET base for OHP may also be used.

<Fixing Step and Fixing Unit>

The fixing step is a step of fixing the toner image transferred to the recording medium. It is possible to fix the toner image, using the fixing unit. When using two or more colors of toners, a toner image may be fixed each time a toner of any color is transferred to a recording medium, or toner images of all colors of toners may be fixed after they are all transferred to a recording medium and overlaid one on another. The fixing unit is not particularly limited, and a thermal fixing type using a known heating pressurizing unit may be employed. Examples of the heating pressurizing unit include a combination of a heating roller and a pressurizing roller, and a combination of a heating roller, a pressurizing roller, and an endless belt. The heating temperature is not particularly limited, may be appropriately selected depending on the intended purpose, and is preferably 80 degrees C. or higher but 200 degrees C. or lower. As needed, for example, a known optical fixing device may be used in combination with the fixing unit.

<Cleaning Step and Cleaning Unit>

The cleaning step is a step of removing the toner remaining on the image bearer, and can be suitably performed by the cleaning unit.

As the cleaning unit, the cleaning blade of the present disclosure is used.

It is preferable that the elastic member of the cleaning blade contact the surface of the image bearer at a pressing force of 10 N/m or greater but 100 N/m or less. When the pressing force is less than 10 N/m, cleaning failure tends to occur because a toner passes through the contact part of the elastic member of the cleaning blade contacting the surface of the image bearer. When the pressing force is greater but 100 N/m, the cleaning blade may curl up due to increase of the frictional force at the contact part. The pressing force is preferably 10 N/m or greater but 50 N/m or less.

The pressing force can be measured with a measuring instrument embedded with a small-size compression-type load cell available from Kyowa Electronic Instruments Co., Ltd.

The angle θ formed between a tangent line extending along a portion at which the elastic member of the cleaning blade contacts the surface of the image bearer and an end surface of the cleaning blade is not particularly limited, may be appropriately selected depending on the intended purpose, and is preferably 65 degrees or greater but 85 degrees or less.

When the angle θ is less than 65 degrees, the cleaning blade may curl up. When the angle θ is greater than 85 degrees, cleaning failure may occur.

<Other Steps and Other Units>

Examples of the other units include a charge eliminating unit, a recycling unit, and a controlling unit.

Examples of the other steps include a charge eliminating step, a recycling step, and a controlling step.

—Charge Eliminating Step and Charge Eliminating Unit—

The charging eliminating step is a step of applying a charging eliminating bias to the image bearer to eliminate charges from the image bearer, and can be suitably performed by the charge eliminating unit.

The charge eliminating unit is not particularly limited and needs at least to be able to apply a charge eliminating bias to the image bearer. The charge eliminating unit may be appropriately selected from known charge eliminating devices. Preferable examples of the charge eliminating unit include a charge eliminating lamp.

—Recycling Step and Recycling Unit—

The recycling step is a step of recycling the toner removed in the cleaning step to the developing unit, and can be suitably performed by the recycling unit.

The recycling unit is not particularly limited. Examples of the recycling unit include a known conveying unit.

—Controlling Step and Controlling Unit—

The controlling step is a step of controlling each step and can be suitably performed by the controlling unit.

The controlling unit is not particularly limited and may be appropriately selected depending on the intended purpose so long as the controlling unit can control the operations of each unit. Examples of the controlling unit include devices such as a sequencer and a computer.

An example of an image forming apparatus of the present disclosure will be described with reference to the drawings.

FIG. 4 is a schematic view illustrating an example of a configuration of an image forming apparatus 500 of the present disclosure. The image forming apparatus 500 includes four image forming units 1Y, 1C, 1M, and 1K for yellow, magenta, cyan, and black (hereinafter may be described as Y, C, M, and K). These image forming units use Y, C, M, and K toners having different colors from one another as image forming substances for forming images, but are identical with one another in the other respects.

A transfer unit 60 including an intermediate transfer belt 14 serving as an intermediate transfer medium is disposed above the four image forming units 1. In this configuration, toner images of the respective colors formed on the surfaces of photoconductors 3Y, 3C, 3M, and 3K included in the image forming units 1Y, 1C, 1M, and 1K to be described in detail below are transferred to the surface of the intermediate transfer belt 14 in an overlaying manner.

An optical writing unit 40 is disposed below the four image forming units 1. The optical writing unit 40 serving as a latent image forming unit irradiates the photoconductors 3Y, 3C, 3M, and 3K of the image forming units 1Y, 1C, 1M, and 1K with laser light L generated based on image information. As a result, electrostatic latent images for Y, C, M, and K are formed on the photoconductors 3Y, 3C, 3M, and 3K. While deflecting laser light L emitted from a light source by a polygon mirror 41 driven to rotate by a motor, the optical writing unit 40 irradiates the photoconductors 3Y, 3C, 3M, and 3K with the laser light L through a plurality of optical lenses and mirrors. Instead of this configuration, a configuration for performing laser scan by a LED array may be employed.

A first paper feeding cassette 151 and a second paper feeding cassette 152 are disposed below the optical writing unit 40 in a vertically stacked state. A plurality of recording media P overlaid in the form of a paper bundle are stored in each of the paper feeding cassettes. A first paper feeding roller 151*a* and a second paper feeding roller 152*a* are in contact with the topmost recording media P, respectively. When the first paper feeding roller 151*a* is driven to rotate counterclockwise in FIG. 4 by a drive unit, the topmost recording medium P in the first paper feeding cassette 151 is sent out to a paper feeding path 153 provided in an extending manner in the vertical direction at the right-hand side of the cassette in FIG. 4. When the second paper feeding roller 152*a* is driven to rotate counterclockwise in FIG. 4 by a drive unit, the topmost recording medium P in the second paper feeding cassette 152 is sent out to the paper feeding path 153.

A plurality of pairs of conveying rollers 154 are disposed in the paper feeding path 153. A recording medium P sent to the paper feeding path 153 is conveyed through the paper feeding path 153 bottom upward in FIG. 4, being sandwiched between the rollers of the pairs of conveying rollers 154.

A pair of registration rollers 55 are disposed at a downstream end of the paper feeding path 153 in the conveying direction. The pair of registration rollers 55 once stop rotating immediately after the registration rollers 55 catch the recording medium P sent from the pair of conveying rollers 154 between the registration rollers 55. Then, the pair of registration rollers 55 send out the recording medium P to a secondary transfer nip described below at an appropriate timing.

FIG. 5 is a view illustrating a schematic configuration of one of the four image forming units 1.

As illustrated in FIG. 5, the image forming unit 1 includes a drum-shaped photoconductor 3 serving as an image bearer. Although the photoconductor 3 has a drum-like shape, the photoconductor 3 may have a sheet shape or an endless belt-type shape.

For example, a charging roller 4, a developing device 5, a primary transfer roller 7, a cleaning device 6, a lubricant applying device 10, and a charge eliminating lamp are disposed around the photoconductor 3. The charging roller 4 is a charging member included in a charging device serving as a charging unit. The developing device 5 is a developing unit configured to change a latent image formed on the surface of the photoconductor 3 to a toner image. The primary transfer roller 7 is a primary transfer member included in a primary transfer device serving as a primary transfer unit configured to transfer the toner image on the surface of the photoconductor 3 to the intermediate transfer belt 14. The cleaning device 6 is a cleaning unit configured to clean any toner remaining on the photoconductor 3 after the toner image is transferred to the intermediate transfer belt 14. The lubricant applying device 10 is a lubricant applying unit configured to apply a lubricant to the surface of the photoconductor 3 after cleaned by the cleaning device 6. The charge eliminating lamp is a charge eliminating unit configured to eliminate a surface potential on the photoconductor 3 after cleaned.

The charging roller 4 is disposed contactlessly at a predetermined distance from the photoconductor 3 and configured to charge the photoconductor 3 to a predetermined polarity and to a predetermined potential. The surface of the photoconductor 3 uniformly charged by the charging roller 4 is irradiated with laser light L based on image information from the optical writing unit 40 serving as a latent image forming unit, and an electrostatic latent image is formed on the surface of the photoconductor 3.

The developing device 5 includes a developing roller 51 serving as a developer bearer. A developing bias is applied to the developing roller 51 from a power source. A supplying screw 52 and a stirring screw 53 configured to stir the developer stored in the casing of the developing device 5 while conveying the developer to opposite directions from each other are provided in the casing of the developing device 5. A doctor 54 configured to regulate the developer borne on the developing roller 51 is also provided. The toner in the developer stirred and conveyed by the two screws, namely the supplying screw 52 and the stirring screw 53 is charged to a predetermined polarity. The developer is scooped up onto the surface of the developing roller 51. The developer scooped up is regulated by the doctor 54, and the toner attaches to the latent image on the photoconductor 3 at a developing region facing the photoconductor 3.

The cleaning device 6 includes, for example, a cleaning blade 62. The cleaning blade 62 contacts the photoconductor 3 in a counter direction to the surface motion direction of the photoconductor 3.

The lubricant applying device 10 includes, for example, a solid lubricant 103 and a lubricant pressurizing spring 103*a*, and uses a fur brush 101 as an applying brush for applying the solid lubricant 103 to the photoconductor 3. The solid lubricant 103 is held on a bracket 103*b* and pressurized to the fur brush 101 side by the lubricant pressurizing spring 103*a*. The solid lubricant 103 is scraped and applied to the photoconductor 3 by the fur brush 101 that is rotating in a direction in which the fur brush 101 is taken away when photoconductor 3 rotates in its rotating direction. The lubricant applied to the photoconductor maintains the coefficient of friction on the surface of the photoconductor 3 to 0.2 or less during a non-image forming operation.

The charging device is a contactless adjacent disposition type of which charging roller 4 is disposed adjacently to the photoconductor 3. As the charging device, known configurations represented by a corotron, a scorotron, and a solid state charger may be used. Among these charging methods, a contact charging method or a contactless adjacent disposition method are particularly preferable and have advantages such as a high charging efficiency, low ozone emission, and device downsizing.

As the light source of the laser light L of the optical writing unit 40 and the light sources of, for example, a charge eliminating lamp, all kinds of light emitting articles such as a fluorescent lamp, a tungsten lamp, a halogen lamp, a mercury lamp, a sodium-vapor lamp, a light emitting diode (LED), a laser diode (LD), and electroluminescence (EL) may be used.

In order to enable irradiation with only light in a desired wavelength range, various filters such as a sharp cut filter, a band pass filter, a near infrared cut filter, a dichroic filter, an interference filter, and a color conversion filter may be used.

Among these light sources, a light emitting diode and a laser diode having a high irradiation energy and capable of emitting long-wavelength light of 600 nm or longer but 800 nm or shorter are suitably used.

The transfer unit 60 serving as a transfer unit illustrated in FIG. 4 includes, for example, a belt cleaning unit 162, a first bracket 63, and a second bracket 64 in addition to the intermediate transfer belt 14. The transfer unit 60 also includes, for example, four primary transfer rollers 7Y, 7C, 7M, and 7K, a secondary transfer backup roller 66, a drive roller 67, an auxiliary roller 68, and a tension roller 69. The intermediate transfer belt 14 is endlessly moved counterclockwise in FIG. 4, being driven to rotate by the drive roller 67 and hung on these eight roller members in a tense state. The four primary transfer rollers 7Y, 7C, 7M, and 7K form primary transfer nips by nipping the endlessly moved intermediate transfer belt 14 between themselves and the photoconductors 3Y, 3C, 3M, and 3K. The primary transfer rollers apply a transfer bias having a polarity (e.g., positive) opposite to the toner to the back surface (internal circumferential surface of the loop) of the intermediate transfer belt 14. As the intermediate transfer belt 14 sequentially passes the primary transfer nips for Y, C, M, and K along with the endless movement thereof, Y, C, M, and K toner images on the photoconductors 3Y, 3C, 3M, and 3K are primarily transferred to the external surface of the intermediate transfer belt 14 in an overlaid state. As a result, a four color-overlaid toner image (hereinafter, may be referred to as four-color toner image) is formed on the intermediate transfer belt 14.

The secondary transfer backup roller 66 forms a secondary transfer nip by nipping the intermediate transfer belt 14 between itself and a secondary transfer roller 70 disposed outside the loop of the intermediate transfer belt 14. The pair of registration rollers 55 described above send out the recoding medium P sandwiched between the registration rollers 55 to the secondary transfer nip at a timing at which the recording medium P can be synchronous with the four-color toner image on the intermediate transfer belt 14. Due to influences of a secondary transfer electric field formed between the secondary transfer roller 70 to which a secondary transfer bias is applied and the secondary transfer backup roller 66, and a nip pressure, the four-color toner image on the intermediate transfer belt 14 is secondarily transferred collectively to the recording medium P in the secondary transfer nip. Then, being mixed with the white color of the recording medium P, the four-color toner image becomes a full-color toner image.

A remaining toner left untransferred to the recording medium P is adhering to the intermediate transfer belt 14 that has passed the secondary transfer nip. The remaining toner is cleaned by the belt cleaning unit 162. The belt cleaning unit 162 is configured to scrape away and remove the remaining toner on the intermediate transfer belt 14 by the belt cleaning blade 162*a*, which contacts the external surface of the intermediate transfer belt 14.

The first bracket 63 of the transfer unit 60 is configured to sway at a predetermined rotation angle about the rotation axis of the auxiliary roller 68 along with on and off of solenoid driving. When forming a monochrome image, the image forming apparatus 500 slightly rotates the first bracket 63 counterclockwise in FIG. 4 by driving the solenoid. By this rotation, the primary transfer rollers 7Y, 7C, and 7M for Y, C, and M revolve about the rotation axis of the auxiliary roller 68 counterclockwise in FIG. 4, to separate the intermediate transfer belt 14 from the photoconductors 3Y, 3C, and 3M for Y, C, and M. Then, among the four image forming units 1Y, 1C, 1M, and 1K, only the image forming unit 1K for K is driven to form a monochrome image. This makes it possible to avoid wearing of each member constituting the image forming units 1 for Y, C, and M due to wastefully driving these image forming units 1 during formation of a monochrome image.

A fixing unit 80 is disposed above the secondary transfer nip in FIG. 4. The fixing unit 80 includes a pressurizing heating roller 81 internally including a heat generation source such as a halogen lamp, and a fixing belt unit 82. The fixing belt unit 82 includes, for example, a fixing belt 84 serving as a fixing member, a heating roller 83 internally including a heat generation source such as a halogen lamp, a tension roller 85, a drive roller 86, and a temperature sensor. The fixing belt 84 having an endless shape is endlessly moved counterclockwise in FIG. 4, being hung on the heating roller 83, the tension roller 85, and the drive roller 86 in a tense state. Along with this endless movement, the fixing belt 84 is heated on the back surface by the heating roller 83. The pressurizing heating roller 81, which is driven to rotate clockwise in FIG. 4, contacts the external surface of the fixing belt 84 heated in this way, at a portion of the fixing belt 84 hung on the heating roller 83. As a result, a fixing nip at which the pressurizing heating roller 81 and the fixing belt 84 contact each other is formed.

The temperature sensor is disposed outside the loop of the fixing belt 84 in a manner to face the external surface of the fixing belt 84 via a predetermined gap, and configured to sense the surface temperature of the fixing belt 84 immediately before entering the fixing nip. The sensing result is sent to a fixing power source circuit. Based on the sensing result of the temperature sensor, the fixing power source circuit controls turning on or off power supply to the heat generation source internally included in the heating roller 83 and the heat generation source internally included in the pressurizing heating roller 81.

The recording medium P that has passed the secondary transfer nip described above is separated from the intermediate transfer belt 14 and then sent into the fixing unit 80. The recording medium P is heated and pressurized by the fixing belt 84 along with being conveyed bottom upward in FIG. 4 being nipped by the fixing nip in the fixing unit 80. As a result, the full-color toner image is fixed on the recording medium P.

The recording medium P that has undergone the fixing process in this way passes between the rollers of a pair of paper ejecting rollers 87, and is then ejected to outside the apparatus. A stack portion 88 is formed on the upper surface of the housing of the image forming apparatus 500 body. The recording medium P ejected to outside the apparatus by the pair of paper ejecting rollers 87 is sequentially stacked on the stack portion 88.

Four toner cartridges 100Y, 100C, 100M, and 100K storing Y, C, M, and K toners are disposed above the transfer unit 60. The Y, C, M, and K toners in the toner cartridges 100Y, 100C, 100M, and 100K are appropriately supplied into the developing devices 5Y, 5C, 5M, and 5K of the image forming units 1Y, 1C, 1M, and 1K. These toner cartridges 100Y, 100C, 100M, and 100K are attachable on and detachable from the image forming apparatus body independently from the image forming units 1Y, 1C, 1M, and 1K.

Next, an image forming operation of the image forming apparatus 500 will be described.

First, when a print execution signal from, for example, an operation unit is received, predetermined voltages or currents are applied to the charging roller 4 and the developing roller 51 sequentially at predetermined timings. Likewise, predetermined voltages or currents are applied to the light sources of, for example, the optical writing unit 40 and the charge eliminating lamp sequentially at predetermined timings. Synchronously, the photoconductor 3 is driven to rotate in the direction of the arrow in FIG. 5 by a photoconductor drive motor serving as a drive unit.

When the photoconductor 3 rotates in the direction of the arrow in FIG. 4, first, the surface of the photoconductor 3 is charged uniformly to a predetermined potential by the charging roller 4. Then, the optical writing unit 40 irradiates the photoconductor 3 with laser light L corresponding to image information, and charges are eliminated from the portion of the surface of the photoconductor 3 irradiated with the laser light L, to form an electrostatic latent image.

The surface of the photoconductor 3 on which the electrostatic latent image is formed is rubbed in a sliding manner by the magnetic brush of the developer formed on the developing roller 51 in a region where the photoconductor 3 faces the developing device 5. Here, the negatively charged toner on the developing roller 51 is moved to the electrostatic latent image side by a predetermined developing bias applied to the developing roller 51, to be changed to a toner image (or to be developed). The respective image forming units 1 perform the same image forming process, and form toner images of the respective colors on the surfaces of the photoconductors 3Y, 3C, 3M, and 3K of the image forming units 1Y, 1C, 1M, and 1K.

In the way described above, in the image forming apparatus 500, the developing device 5 reversally develops the electrostatic latent image formed on the photoconductor 3 with a toner charged to the negative polarity. In the present embodiment, an example in which a contactless charging roller method of N/P type (negative/positive, a toner attaches to places having a low potential) is employed has been described. However, this is a non-limiting example.

The toner images of the respective colors formed on the surface of the photoconductors 3Y, 3C, 3M, and 3K are primarily transferred sequentially in a manner that the toner images are overlaid one on another on the surface of the intermediate transfer belt 14. As a result, a four-color toner image is formed on the intermediate transfer belt 14.

The four-color toner image formed on the intermediate transfer belt 14 is transferred to a recording medium P fed to the secondary transfer nip from the first paper feeding cassette 151 or the second paper feeding cassette 152 via the rollers of the pair of registration rollers 55. Here, the recording medium P is once stopped in a state of being sandwiched between the pair of registration rollers 55, adjusted to be synchronous with the leading end of the image on the intermediate transfer belt 14, and fed to the secondary transfer nip. The recording medium P to which the toner image is transferred is separated from the intermediate transfer belt 14, and conveyed to the fixing unit 80. Then, by the recording medium P to which the toner image is transferred passing through the fixing unit 80, the toner image is fixed on the recording medium P by heat and pressure. The recording medium P on which the toner image is fixed is ejected to outside the image forming apparatus 500 and stacked on the stack portion 88.

In the meantime, the belt cleaning unit 162 removes the remaining toner left untransferred, from the surface of the intermediate transfer belt 14 from which the toner image has been transferred to the recording medium P at the secondary transfer nip.

The cleaning device 6 removes any remaining toner left untransferred, from the surfaces of the photoconductors 3 from which the toner images of the respective colors have been transferred to the intermediate transfer belt 14 at the primary transfer nips. Then, the lubricant applying device 10 applies a lubricant to the surfaces of the photoconductors 3, and then the charge eliminating lamp eliminates charges from the surfaces of the photoconductors 3.

As the image forming unit 1 of the image forming apparatus 500, the photoconductor 3, and, for example, the charging roller 4, the developing device 5, the cleaning device 6, and the lubricant applying device 10 which serve as a process unit are accommodated within a frame 2 as illustrated in FIG. 5. In this way, the image forming unit 1 serving as a process cartridge is integrally attachable on and detachable from the image forming apparatus 500 body. In the image forming apparatus 500, the photoconductor 3 and the process unit of the image forming unit 1 serving as the process cartridge are integrally replaced with new ones. However, the photoconductor 3, the charging roller 4, the developing device 5, the cleaning device 6, and the lubricant applying device 10 may be replaced with new ones unit by unit. The lubricant applying device is not indispensable.

As the toner to be used in the image forming apparatus 500, it is preferable to use a polymerization toner produced by a suspension polymerization method, an emulsion polymerization method, or a dispersion polymerization method that can produce a toner having a high circularity and a small particle diameter in order to improve image qualities. Above all, a polymerization toner having a volume average particle diameter of 5.5 micrometers or less is preferable in terms of forming a high-resolution image.

(Process Cartridge)

A process cartridge of the present disclosure includes at least an image bearer and a cleaning unit configured to remove a toner remaining on the image bearer, and further includes other units as needed.

As the cleaning unit, the cleaning blade of the present disclosure is used.

The process cartridge is a device (part) that internally includes the image bearer and the cleaning blade of the present disclosure, additionally includes at least one unit selected from a charging unit, a light exposure unit, a developing unit, a transfer unit, a cleaning unit, and a charge eliminating unit, and is attachable on and detachable from the image forming apparatus.

EXAMPLES

The present disclosure will be described below by way of Examples and Comparative Examples. The present disclosure should not be construed as being limited to the Examples below. Any value expressed by part represents a value in the part by mass unit unless otherwise particularly specified.

<Hysteresis Loss Ratio>

According to JIS K6400-2, the hysteresis loss ratio of the surface layer including the leading end ridgeline portion was measured by extending a sample, which was cut into a dumbbell shape Type 7, by 100% at a tensile speed of 200 mm/min and relaxing the sample to 0% at the same speed using a texture analyzer obtained from Shimadzu Corporation, and calculating the integral values of stresses during this test.

<JIS-A Hardness of Elastic Member>

The JIS-A hardness of the surface layer and the base layer was measured according to JIS K6253 using a micro rubber hardness meter MD-1 obtained from Kobunshi Keiki Co., Ltd.

<Tan δ Peak Temperature>

The tan δ peak temperature of the surface layer was measured using a strip-shaped sample, and using DMS6100 obtained from SIT Nanotechnology Inc. in a tensile mode at a frequency of 10 Hz at a temperature elevation rate of 2 degrees C./min according to JIS K6394.

<Amount of MSE Wear>

An amount of MSE wear of the surface layer was measured by projecting a slurry liquid, which was obtained by dispersing alumina particles having a particle diameter of 1 micrometer in water at a mass concentration of 3%, by 100 g onto a smooth portion of a cleaning blade rubber using a MSE wear tester obtained from Palmeso Co., Ltd. at a speed of 100 m/sec at a projection rate of 2 g/min, and measuring the depth of wear with a laser microscope (LEXT OLS4100 obtained from Olympus Corporation).

<Martens Hardness>

The Martens hardness was measured using an ultra microhardness tester HM-2000 obtained from Fischer Instruments K.K. under conditions that a Vickers indenter was brought into contact with a position that was apart by 20 micrometers from the leading end ridgeline portion of the surface layer, indented into the position at a force of 8 mN for 30 seconds, retained there for 5 seconds, and pulled out at a force of 9.8 mN in 30 seconds.

<Average Circularity of Toner>

The average circularity of the toner was measured with a flow-type particle image analyzer (FPIA-2000 obtained from Sysmex Corporation). Specifically, a surfactant (alkyl benzene sulfonate) serving as a dispersant was added by from 0.1 mL through 0.5 mL into previously impurity solid-removed water (from 100 mL through 150 mL) in a container, and the measurement sample (toner) was further added into the resultant by about from 0.1 g through 0.5 g. Subsequently, the suspension liquid in which the toner was dispersed was subjected to dispersion treatment for from 1 minute through 3 minutes using an ultrasonic disperser, in a manner that the concentration of the dispersion liquid would be from 3,000 particles/microliter through 10,000 particles/microliter. The resultant was set in the analyzer described above, and the shape and distribution of the toner were measured. Based on the results of measurement, C2/C1 was calculated, where C1 represents the perimeter of an actual projected shape of a toner having a projected area S as illustrated in FIG. 6 (A), and C2 represents the perimeter of a true circle illustrated in FIG. 6 (B) having the same projected area S. An average of C2/C1 values were obtained as the average circularity.

<Volume Average Particle Diameter of Toner>

The volume average particle diameter of the toner was measured by a Coulter counter method. Specifically, the number distribution and volume distribution data of the toner measured by a Coulter multisizer type 2E (obtained from Beckman Coulter Inc.) were sent to a personal computer via an interface (obtained from Nikkaki Bios Co., Ltd.) and analyzed. More specifically, a 1% by mass NaCl aqueous solution obtained by using primary sodium chloride was prepared as an electrolytic solution. A surfactant (alkyl benzene sulfonate) serving as a dispersant was added by from 0.1 mL through 5 mL into the electrolytic aqueous solution (from 100 mL through 150 mL). A toner serving as a test sample was further added into the resultant by from 2 mg through 20 mg, and the resultant was subjected to dispersion treatment for from 1 minute through 3 minutes using an ultrasonic disperser. The electrolytic aqueous solution was poured into another beaker by from 100 mL through 200 mL, and the solution having been subjected to the dispersion treatment was added into the resultant at a predetermined concentration. The resultant was fed into the Coulter multisizer type 2E.

The particle diameter of 50,000 toner particles was measured using a 100-micrometer aperture. Toner particles having a particle diameter of 2.00 micrometers or greater but 32.0 micrometers or less were measured using thirteen channels of: 2.00 micrometers or greater but less than 2.52 micrometers; 2.52 micrometers or greater but less than 3.17 micrometers; 3.17 micrometers or greater but less than 4.00 micrometers; 4.00 micrometers or greater but less than 5.04 micrometers; 5.04 micrometers or greater but less than 6.35 micrometers; 6.35 micrometers or greater but less than 8.00 micrometers; 8.00 micrometers or greater but less than 10.08 micrometers; 10.08 micrometers or greater but less than 12.70 micrometers; 12.70 micrometers or greater but less than 16.00 micrometers; 16.00 micrometers or greater but less than 20.20 micrometers; 20.20 micrometers or greater but less than 25.40 micrometers; 25.40 micrometers or greater but less than 32.00 micrometers; and 32.00 micrometers or greater but less than 40.30 micrometers.

Then, the volume average particle diameter was calculated according to a relational expression "volume average particle diameter=ΣXfV/ΣfV", where "X" represents the representative diameter in each channel, "V" represents an equivalent volume at the representative diameter in each channel, and "f" represents the number of particles in each channel.

Example 1

<Toner Production Example>

Toner base particles having an average circularity of 0.98 and a volume average particle diameter of 4.9 micrometers were produced by a polymerization method. With the obtained toner base particles (100 parts by mass), silica particles having a small diameter (H2000 obtained from Clariant AG) (1.5 parts by mas), titanium oxide particles having a small diameter (MT-150AI obtained from TAYCA Corporation) (0.5 parts by mass), and silica particles having a large particle diameter (UFP-30H obtained from Denka Company Limited) were stirred and mixed using a HENSCHEL mixer, to produce a toner.

<Cleaning Blade Production Example>

A urethane rubber (obtained from Nitta Chemical Industrial Products Co., Ltd.) in which a polyester-based urethane rubber adjusted to have a hardness of 61 degrees and a polyester-based urethane rubber adjusted to have a hardness of 74 degrees by a centrifugal molding method were sequentially laminated as a surface layer and a base layer respectively was prepared and cut into a predetermined dimension. Subsequently, the resultant was assembled with a supporting member having a predetermined dimension, to prepare a cleaning blade. The thickness of the surface layer was 0.5 mm, and the thickness of the base layer was 1.5 mm. A rubber having a desired hysteresis loss ratio was obtained by adjusting the prescription such as the amount of isocyanate added, and the kind and the mix ratio of the crosslinking agent, in a manner that the hardness and the tan δ peak temperature presented in Tables would be satisfied at the same time.

<Evaluation of Cleaning Blade>

Next, the cleaning blade 1 produced as described above was attached on a color multifunction peripheral (RICOH IM C6000) by a predetermined amount of leading end engagement (at a linear pressure of 20 N/m) at a predetermined attaching angle (about 79 degrees).

With the color multifunction peripheral (RICOH IM C6000) loaded with the toner described above, a chart (A4 size, latitudinally long) having an image area ratio of 0.5% and including a longitudinal band portion was output on 100,000 sheets at 3 prints/job in an environment at 23 degrees C. and 55% RH. Subsequently, the cleaning ability, the depth of wear of the leading end ridgeline portion, local wear of the leading end ridgeline portion, and depth of MSE wear in the surface layer were evaluated in the manners described below.

<Cleaning Ability>

After the chart was output on 100,000 sheets, an image for evaluation (4A size, latitudinally long) representing a three-band chart including longitudinal band patterns (with respect to the sheet moving direction) having a width of 43 mm was output on 20 sheets. Subsequently, the output images were visually observed, and the cleaning ability was evaluated according to the criteria described below. An abnormal image represents an image appearing in the printed image in the form of a streak or a band, or a white dot image.

<Evaluation Criteria>

A: There was no abnormal image.

B: Slight abnormality was observed, but nonproblematic in terms of quality.

C: There was an abnormal image.

<Depth of Wear of Leading End Ridgeline Portion, Local Wear of Leading End Ridgeline Portion, and Depth of MSE Wear in Surface Layer>

These properties were calculated by shape measurement of the leading end ridgeline portion of the cleaning blade using a laser microscope (LEXT OLS4100 obtained from Olympus Corporation). Any local wear (e.g., chipping) of the leading end ridgeline portion was observed.

Examples 2 to 15 and Comparative Examples 1 to 7

These Examples and Comparative Examples are the same as Example 1, except that cleaning blades used were formed of a single-layer urethane rubber (obtained from Nitta Chemical Industrial Products Co., Ltd.) or a urethane rubber in which a combination of a surface layer and a base layer having different prescriptions (both obtained from Nitta Chemical Industrial Products Co., Ltd.) were laminated. The property values and evaluation results of each cleaning blade were presented in Table 1-1-1 to Table 1-3-2 below.

The compounds represented by abbreviations in Tables are as follows.

MDI: 4,4'-diphenylmethane diisocyanate

TDI: 2,4-tolylene diisocyanate

TABLE 1-1-1

| | | Ex. 1 | Ex. 2 | Ex. 3 | Ex. 4 |
|---|---|---|---|---|---|
| Cleaning blade | | 1 | 2 | 3 | 4 |
| Surface layer | Material name | Urethane rubber A | Urethane rubber A | Urethane rubber B | Urethane rubber B |
| | Main structure of polyurethane | Polyester | Polyester | Polyester | Polyester |
| | Isocyanate used | MDI | MDI | MDI | MDI |
| | Hysteresis loss ratio at 100% extension | 10% | 10% | 6.6% | 6.6% |
| | JIS A hardness [degree] | 61 | 61 | 56 | 56 |

TABLE 1-1-1-continued

| | | Ex. 1 | Ex. 2 | Ex. 3 | Ex. 4 |
|---|---|---|---|---|---|
| | tan δ peak temperature | +1.4 degrees C. | +1.4 degrees C. | −8.5 degrees C. | −8.5 degrees C. |
| | Martens hardness [N/mm$^2$] | 0.67 | 0.67 | 0.57 | 0.57 |
| Base layer | Material name | Urethane robber K | Urethane rubber L | Urethane rubber K | Urethane rubber M |
| | Main structure of polyurethane | Polyester | Polyether | Polyester | Polyester |
| | Isocyanate used | MDI | MDI | MDI | MDI |
| | Hysteresis loss ratio at 100% extension | 16% | 27% | 16% | 33% |
| | JIS A hardness [degree] | 74 | 75 | 74 | 80 |
| | tan δ peak temperature | +2.3 degrees C. | −3.6 degrees C. | +2.3 degrees C. | +12 degrees C. |
| | Martens hardness [N/mm$^3$] | 1.2 | 0.91 | 1.2 | 1.6 |
| Result | Cleaning ability | A | A | A | B |
| | Wear depth of leading end ridgeline portion [micrometer] | 5.5 | 5.8 | 3.8 | 4.2 |
| | Local wear of leading end ridgeline portion | Absent | Absent | Absent | Absent |
| | MSE wear depth in surface layer [micrometer] | 15 | 15 | 12 | 12 |

TABLE 1-1-2

| | | Ex. 5 | Ex. 6 | Ex. 7 | Ex. 8 |
|---|---|---|---|---|---|
| Cleaning blade | | 5 | 6 | 7 | 8 |
| Surface layer | Material name | Urethane rubber C | Urethane rubber D | Urethane rubber E | Urethane rubber F |
| | Main structure of polyurethane | Polyester | Polyester | Polyester | Polyester |
| | Isocyanate used | MDI | MDI | MDI | MDI |
| | Hysteresis loss ratio at 100% extension | 15% | 13% | 4.8% | 7.8% |
| | JIS A hardness [degree] | 52 | 50 | 65 | 58 |
| | tan δ peak temperature | −14 degrees C. | −16 degrees C. | −13 degrees C. | −2.7 degrees C. |
| | Martens hardness [N/mm$^2$] | 0.54 | 0.45 | 0.75 | 0.61 |
| Base layer | Material name | Urethane rubber N | Urethane rubber K | Urethane rubber K | Urethane rubber K |
| | Main structure of polyurethane | Polyester | Polyester | Polyester | Polyester |
| | Isocyanate used | MDI | MDI | MDI | MDI |
| | Hysteresis loss ratio at 100% extension | 23% | 16% | 16% | 16% |
| | JIS A hardness [degree] | 70 | 74 | 74 | 74 |
| | tan δ peak temperature | −4.5 degrees C. | +2.3 degrees C. | +2.3 degrees C. | +2.3 degrees C. |
| | Martens hardness [N/mm$^3$] | 0.95 | 1.2 | 1.2 | 1.2 |
| Result | Cleaning ability | B | B | A | A |
| | Wear depth of leading end ridgeline portion [micrometer] | 10 | 9.5 | 2.6 | 4.9 |
| | Local wear of leading end ridgeline portion | Absent | Absent | Absent | Absent |
| | MSE wear depth in surface layer [micrometer] | 11 | 9.7 | 14 | 11 |

TABLE 1-2-1

| | | Ex. 9 | Ex. 10 | Ex. 11 | Ex. 12 |
|---|---|---|---|---|---|
| Cleaning blade | | 9 | 10 | 11 | 12 |
| Surface layer | Material name | Urethane rubber G | Urethane rubber B | Urethane rubber I | Urethane rubber J |
| | Main structure of polyurethane | Polyether | Polyether | Polyether | Polyether |
| | Isocyanate used | TDI | TDI | TDI | TDI |
| | Hysteresis loss ratio at 100% extension | 8.0% | 5.0% | 4.5% | 3.7% |
| | JIS A hardness [degree] | 61 | 56 | 53 | 50 |
| | tan δ peak temperature | −21 degrees C. | −35 degrees C. | −38 degree C. | −42 degrees C. |
| | Martens hardness [N/mm$^2$] | 0.66 | 0.56 | 0.50 | 0.45 |
| Base layer | Material name | Urethane rubber K | Urethane rubber K | Urethane rubber L | Urethane rubber L |
| | Main structure of polyurethane | Polyester | Polyester | Polyether | Polyether |
| | Isocyanate used | MDI | MDI | MDI | MDI |
| | Hysteresis loss ratio at 100% extension | 16% | 16% | 27% | 27% |
| | JIS A hardness [degree] | 74 | 74 | 75 | 75 |
| | tan δ peak temperature | +2.3 degree C. | +2.3 degrees C. | −3.6 degrees C. | −3.6 degrees C. |
| | Martens hardness [N/mm$^3$] | 1.2 | 1.2 | 0.91 | 0.91 |
| Result | Cleaning ability | B | A | | A |
| | depth of leading end ridgeline portion [micrometer] | 12 | 6.5 | 3.5 | 1.8 |
| | Local wear of leading end ridgeline portion | Absent | Absent | Absent | Absent |
| | MSE wear depth in surface layer [micrometer] | 4.5 | 6.2 | 6.7 | 7.1 |

TABLE 1-2-2

| | | Ex. 13 | Ex. 14 | Ex. 16 |
|---|---|---|---|---|
| Cleaning blade | | 13 | 14 | 15 |
| Surface layer | Material game | Urethane rubber A | Urethane rubber E | Urethane rubber G |
| | Main structure of polyurethane | Polyester | Polyester | Polyether |
| | Isocyanate used | MDI | MDI | TDI |
| | Hysteresis loss ratio at 100% extension | 9.8% | 4.8% | 8.0% |
| | JIS A hardness [degree] | 61 | 65 | 61 |
| | tan δ peak temperature | +1.4 degrees C. | −13 degrees C. | −21 degrees C. |
| | Martens hardness [N/mm$^2$] | 0.67 | 0.75 | 0.66 |
| Base layer | Material name | — | — | — |
| | Main structure of polyurethane | — | — | — |
| | Isocyanate used | — | — | — |
| | Hysteresis loss ratio at 100% extension | — | — | — |
| | JIS A hardness [degree] | — | — | — |
| | tan δ peak temperature | — | — | — |
| | Martens hardness [N/mm$^3$] | — | — | — |
| Result | Cleaning ability | B | B | B |
| | Wear depth of leading end ridgeline portion [micrometer] | 13 | 10 | 15 |
| | Local wear of leading end ridgeline portion | Absent | Absent | Absent |
| | MSE wear depth in surface layer [micrometer] | 15 | 14 | 4.5 |

TABLE 1-3-1

| | | Comp. Ex. 1 | Comp. Ex. 2 | Comp. Ex. 8 | Comp. Ex. 4 |
|---|---|---|---|---|---|
| Cleaning blade | | 16 | 12 | 18 | 19 |
| Surface layer | Material name | Urethane rubber M | Urethane rubber N | Urethane rubber O | Urethane rubber P |
| | Main structure of polyurethane | Polyester | Polyester | Polyester | Polyester |
| | Isocyanate used | MDI | MDI | MDI | MDI |
| | Hysteresis loss ratio at 100% extension | 33% | 23% | 18% | 17% |
| | JIS A hardness [degree] | 80 | 70 | 67 | 68 |

TABLE 1-3-1-continued

| | | Comp. Ex. 1 | Comp. Ex. 2 | Comp. Ex. 8 | Comp. Ex. 4 |
|---|---|---|---|---|---|
| | tan δ peak temperature | +12 degrees C. | −4.5 degrees C. | −5.8 degrees C. | −0.83 degrees C. |
| | Martens hardness [N/mm$^2$] | 1.6 | 0.95 | 0.67 | 0.91 |
| Base layer | Material name | — | — | Urethane rubber L | Urethane rubber S |
| | Main structure of polyurethane | — | — | Polyether | Polyester |
| | Isocyanate used | — | — | MDI | MDI |
| | Hysteresis loss ratio at 100% extension | — | — | 27% | 38% |
| | JIS A hardness [degree] | — | — | 75 | 85 |
| | tan δ peak temperature | — | — | −3.6 degrees C. | +10 degrees C. |
| | Martens hardness [N/mm$^3$] | — | — | 0.91 | 2.1 |
| Result | Cleaning ability | C | C | C | C |
| | Wear depth of leading end ridgeline portion [micrometer] | 95 | 30 | 25 | 20 |
| | Local wear of leading end ridgeline portion | Present at many places | Present | Present | Present |
| | MSE wear depth in surface layer [micrometer] | 35 | 22 | 18 | 19 |

TABLE 1-3-2

| | | Comp. Ex. 5 | Comp. Ex. 6 | Comp. Ex. 7 |
|---|---|---|---|---|
| Cleaning blade | | 20 | 21 | 22 |
| Surface layer | Material name | Urethane rubber Q | Urethane rubber R | Urethane rubber T |
| | Main structure of polyurethane | Polyether | Polyether | Polyester |
| | Isocyanate used | MDI | TDI | MDI |
| | Hysteresis loss ratio at 100% extension | 25% | 22% | 24% |
| | JIS A hardness [degree] | 78 | 72 | 45 |
| | tan δ peak temperature | +0.32 degrees C. | −7.2 degrees C. | −25 degrees C. |
| | Martens hardness [N/mm$^2$] | 1.2 | 0.89 | 0.40 |
| Base layer | Material name | Urethane rubber N | Urethane rubber N | Urethane rubber L |
| | Main structure of polyurethane | Polyester | Polyester | Polyether |
| | Isocyanate used | MDI | MDI | MDI |
| | Hysteresis loss ratio at 100% extension | 23% | 23% | 27% |
| | JIS A hardness [degree] | 70 | 70 | 75 |
| | tan δ peak temperature | −4.5 degrees C. | −4.5 degrees C. | −3.6 degrees C. |
| | Martens hardness [N/mm$^3$] | 0.96 | 0.95 | 0.91 |
| Result | Cleaning ability | C | C | C |
| | Wear depth of leading end ridgeline portion [micrometer] | 35 | 20 | 25 |
| | Local wear of leading end ridgeline portion | Present | Present | Absent |
| | MSE wear depth in surface layer [micrometer] | 17 | 18 | 16 |

From the results in Table 1-1-1 to Table 1-3-2, it turned out that the cleaning ability and the wear property of the cleaning blades of Examples having a hysteresis loss ratio of 15% or less in the surface layer including the leading end ridgeline portion were better than those of Comparative Examples that did not satisfy this condition.

These results suggest that the cleaning blade of the present disclosure suppresses curling up due to contact with a photoconductor, and slipping-through and adherence of a powder, and can be used for a long term.

Aspects of the present disclosure are, for example, as follows.

<1> A cleaning blade, including:

an elastic blade having a strip shape; and a supporting member supporting the elastic blade, wherein the cleaning blade is configured to bring a leading end ridgeline portion of the elastic blade into contact with a cleaning target member that is moving, and remove a residual matter from a surface of the cleaning target member, and at least a surface layer portion of the elastic blade including the leading end ridgeline portion is formed of a rubber having a hysteresis loss ratio of 15% or less.

<2> The cleaning blade according to <1>, wherein the surface layer portion including the leading end ridgeline portion to be brought into contact with the cleaning target member is formed of a rubber having a tan δ peak temperature of 2 degrees C. or lower.

<3> The cleaning blade according to <1> or <2>, wherein the surface layer portion including the leading end ridgeline portion to be brought into contact with the cleaning target member is formed of a rubber having an amount of MSE wear of 15 micrometers or less.

<4> The cleaning blade according to any one of <1> to <3>, wherein the surface layer portion including the leading end ridgeline portion to be brought into contact with the cleaning target member is formed of a rubber having a JIS-A hardness of 50 degrees or greater but 65 degrees or less.

<5> The cleaning blade according to any one of <1> to <4>, wherein the cleaning blade is a laminate formed of a plurality of rubber layers different in JIS-A hardness.

<6> The cleaning blade according to any one of <1> to <5>, wherein the surface layer portion including the leading end ridgeline portion to be brought into contact with the cleaning target member is formed of a rubber having a Martens hardness of 0.45 N/mm$^2$ or greater but 0.75 N/mm$^2$ or less.

<7> An image forming apparatus, including:

an image bearer;

a charging unit configured to charge a surface of the image bearer;

a light exposure unit configured to expose the image bearer charged to light, to form an electrostatic latent image;

a developing unit configured to develop the electrostatic latent image with a toner to form a visible image;

a transfer unit configured to transfer the visible image to a recording medium;

a fixing unit configured to fix a transferred image transferred to the recording medium; and a cleaning unit configured to remove any toner remaining on the image bearer, wherein the cleaning unit is the cleaning blade according to any one of <1> to <6>.

<8> A process cartridge, including at least:

an image bearer; and a cleaning unit configured to remove any toner remaining on the image bearer, wherein the cleaning unit is the cleaning blade according to any one of <1> to <6>.

The cleaning blade according to any one of <1> to <6>, the image forming apparatus according to <7>, and the process cartridge according to <8> can solve the various problems in the related art and achieve the object of the present disclosure.

REFERENCE SIGNS LIST

1, 1Y, 1C, 1M, 1K: image forming unit
2: frame
3, 3Y, 3C, 3M, 3K: photoconductor
4: charging roller
5, 5Y, 5C, 5M, 5K: developing device
6: cleaning device
7, 7Y, 7C, 7M, 7K: primary transfer roller
10: lubricant applying device
14: intermediate transfer belt
40: optical writing unit
41: polygon mirror
51: developing roller
52: supplying screw
53: stirring screw
54: doctor
55: pair of registration rollers
60: transfer unit
62: cleaning blade
62*a*: leading end surface
62*b*: cleaning blade surface
62*c*: leading end ridgeline portion
63: first bracket
64: second bracket
66: secondary transfer backup roller
67: drive roller
68: auxiliary roller
69: tension roller
70: secondary transfer roller
80: fixing unit
81: pressurizing heating roller
82: fixing belt unit
83: heating roller
84: fixing belt
85: tension roller
86: drive roller
87: pair of paper ejecting rollers
88: stack portion
100Y, 100C, 100M, 100K: toner cartridge
101: fur brush
103: solid lubricant
103*a*: lubricant pressurizing spring
103*b*: bracket
123: image bearer
151: first paper feeding cassette
151*a*: first paper feeding roller
152: second paper feeding cassette
152*a*: second paper feeding roller
153: paper feeding path
154: pair of conveying rollers
162: belt cleaning unit
162*a*: belt cleaning blade
500: image forming apparatus
621: supporting member
622: elastic blade (single layer)
6221: surface layer including leading end ridgeline portion (laminate)
6222: base layer (laminate)
L: laser light
P: recording medium
X: wear

The invention claimed is:

1. A cleaning blade, comprising:

an elastic blade having a strip shape; and a support supporting the elastic blade, wherein the cleaning blade is to bring a leading end ridgeline portion of the elastic blade into contact with a cleaning target that is moving, and remove a residual matter from a surface of the cleaning target, and at least a surface layer portion of the elastic blade including the leading end ridgeline portion includes a rubber having a hysteresis loss ratio of 15% or less.

2. The cleaning blade according to claim 1, wherein the surface layer portion including the leading end ridgeline portion to be brought into contact with the cleaning target is formed of a rubber having a tan δ peak temperature of 2 degrees C. or lower.

3. The cleaning blade according to claim 1, wherein the surface layer portion including the leading end ridgeline portion to be brought into contact with the cleaning target is formed of a rubber having an amount of micro slurry-jet erosion (MSE) wear of 15 micrometers or less.

4. The cleaning blade according to claim 1, wherein the surface layer portion including the leading end ridgeline portion to be brought into contact with the cleaning target is formed of a rubber having a JIS-A hardness of 50 degrees or greater but 65 degrees or less.

5. The cleaning blade according to claim 1, wherein the cleaning blade is a laminate formed of a plurality of rubber layers different in JIS-A hardness.

6. The cleaning blade according to claim 1, wherein the surface layer portion including the leading end ridgeline portion to be brought into contact with the cleaning target is formed of a rubber having a Martens hardness of 0.45 N/mm$^2$ or greater but 0.75 N/mm$^2$ or less.

7. An image forming apparatus, comprising:
an image bearer;
a charger to charge a surface of the image bearer;
a light exposer to expose the image bearer charged to light, to form an electrostatic latent image;
a developer to develop the electrostatic latent image with a toner to form a visible image;
a transferor to transfer the visible image to a recording medium;
a fixer to fix a transferred image transferred to the recording medium; and
a cleaner to remove any toner remaining on the image bearer,
wherein the cleaner includes the cleaning blade according to claim 1.

8. A process cartridge, comprising:
an image bearer; and
a cleaner to remove any toner remaining on the image bearer,
wherein the cleaner includes the cleaning blade according to claim 1.

* * * * *